(12) United States Patent
Alger

(10) Patent No.: US 6,933,053 B2
(45) Date of Patent: *Aug. 23, 2005

(54) ALPHA $AL_2O_3$ AND $TI_2O_3$ PROTECTIVE COATINGS ON ALUMINIDE SUBSTRATES

(76) Inventor: Donald L. Alger, 4050 Paradise Rd., Seville, OH (US) 44273

(*) Notice: Subject to any disclaimer, the term of this patent is extended or adjusted under 35 U.S.C. 154(b) by 12 days.

This patent is subject to a terminal disclaimer.

(21) Appl. No.: 10/391,419

(22) Filed: Mar. 18, 2003

(65) Prior Publication Data
US 2004/0009359 A1 Jan. 15, 2004

Related U.S. Application Data

(63) Continuation-in-part of application No. 09/703,239, filed on Oct. 31, 2000, now Pat. No. 6,599,636.

(51) Int. Cl.$^7$ ............. B32B 15/04; C23C 8/00
(52) U.S. Cl. ......... 428/472; 428/469; 428/701; 428/702; 428/938; 427/255.26; 427/255.29; 148/280; 148/275; 148/285; 148/281
(58) Field of Search ............... 428/472.2, 472, 428/469, 701, 702, 938, 936; 427/255.26, 255.29, 255.4; 148/280, 275, 240, 281, 285

(56) References Cited

U.S. PATENT DOCUMENTS

| | | |
|---|---|---|
| 3,164,493 A | 1/1965 | Lindberg |
| 3,259,526 A | 7/1966 | Walker et al. |
| 3,660,173 A | 5/1972 | Matsuno et al. |
| 3,732,690 A | 5/1973 | Meijer |
| 4,043,839 A | 8/1977 | Hartline, III et al. |
| 4,197,707 A | 4/1980 | Asano |
| 4,266,987 A | 5/1981 | Wang |
| 4,312,641 A | 1/1982 | Verrando et al. |
| 4,314,880 A | 2/1982 | McGuire et al. |
| 4,335,884 A | 6/1982 | Darche |
| 4,398,967 A | 8/1983 | DeVan et al. |
| 4,651,527 A | 3/1987 | Alger |
| 4,765,847 A | 8/1988 | Arai et al. |
| 4,929,287 A | 5/1990 | Hirbod |
| 5,096,508 A | 3/1992 | Breedis et al. |
| 5,294,586 A | 3/1994 | Sigler |
| 5,372,655 A | 12/1994 | Preisser et al. |
| 5,413,642 A | 5/1995 | Alger |
| 5,599,404 A * | 2/1997 | Alger ............ 148/212 |
| 5,620,754 A | 4/1997 | Turchan et al. |

FOREIGN PATENT DOCUMENTS

| | | |
|---|---|---|
| DE | 145283 | 12/1980 |
| GB | 2031955 | 4/1980 |
| GB | 2075556 | 11/1981 |

OTHER PUBLICATIONS

Metallurgical Thermochemistry, Kubaschewski et al., pp. 1–26, 131–137, Pergamon Press.

(Continued)

Primary Examiner—Jennifer McNeil
(74) Attorney, Agent, or Firm—Fay, Sharpe, Fagan, Minnich & McKee, LLP

(57) ABSTRACT

In accordance with one aspect of the present invention, a process for forming a specific reactive element barrier on a titanium and aluminum containing substrate is provided. The process includes creating a dry air atmosphere with a concentration of water vapor below about 750 ppm at a temperature above about 550° C. contiguous to a surface of the substrate on which the barrier layer is to be formed. The temperature is maintained above 550° C. and the water vapor concentration is maintained below about 100 ppm while the water vapor in the dry air atmosphere is reacted with specific reactive elements at the substrate surface. The reaction forms a specific reactive element oxide barrier layer which is strongly bonded to the substrate surface. The barrier layer includes an aluminum oxide layer at the substrate/barrier layer interface and a second oxide layer at a barrier layer/atmosphere interface.

36 Claims, 16 Drawing Sheets

OTHER PUBLICATIONS

"Metal–Metal Oxide–Hydrogen Atmosphere Chart for Brazing or Bright Metal Processing", Supplement to the Welding Research Journal, May 1970, p. 189–192.

"The Oxidation Behavior of CoCrAl Systems Containing Active Element Additions", Allam et al., Oxidation of Metals, vol. 12, No. 1 (1978) pp. 35–66.

"Original HCl Surface Treatment for Diffusion Bonding of Nickel Superalloy Specimens", Billard et al., Metals Technology (Sep. 1978) pp. 309–319.

Wale–Evans, G., Disseration "Improvement of the Oxidation Wear Resistance of Steels by Means of Ion Implantation", presented 1979, pp. 1–3, 30–45.

"VII Improvement in Properties: Additives in Oxidation Resistance", Whittle et al., Phil. Trans. R. Soc. Lond. A 295, pp. 309–329 (1980).

"Influence of Nonmetallic elements on the Compatibilty of Structural Materials With Liquid Alkali Metals", Natesan, Journal of Nuclear Materials, 115 (1983) pp. 251–262.

"Corrosion in Alkali Metal/Molybdenum Heat Pipes", Lundberg et al., AIAA'84, AIAA 19th Thermophysics Conference, Jun. 25–28, 1984, pp. 1–12.

"Reactive Element–Sulfur Interaction and Oxide Scale Adherence", Funkenbusch et al., Metallurgical Transactions A, vol. 16A, Jun. 1985, pp. 1164–1166.

"A Relationship Between Indigenous Impurity Elements and Protective Oxide Scale Adherence Characteristics", Smeggil et al., Metallurgical transactions A, vol. 17A, Jun. 1986, pp. 923–932.

"Adherent $Al_2O_3$ Scales formed on Undoped NiCrAl Alloys", Smialek, Metallurgical Transactions A, vol. 18A, Jan. 1987 pp. 164–167.

*Metal Handbook*, 9th ed., V.13, pp. 56–76, ASM International, 1987.

"The Influence of Sulfur on Adherence of $Al_2O_3$ Grown on Fe–Cr–Al Alloys", Sigler, Oxidation of Metals, vol. 29, Nos. 1/2, 1988 pp. 23–43.

"Effect of 0.1 at .% Zirconium on the Cyclic Oxidation Resistance of β–NiAl", Barrett, Oxidation of Metals, vol. 30, Nos. 5/6, 1988, pp. 361–390.

"Oxide Scale Adhesion and Impurity Segregation at the Scale Metal Interface", Hou et al., Oxidation of Metals, vol. 38, Nos. 5/6, 1992 pp. 323–345.

Heat Pipe Heat Transport System for the Stirling Space Power Converter (SSPC), Alger, NASA Contractor Report 191065, Jan. 1993.

* cited by examiner

ALPHA AL$_2$O$_3$ AND TI$_2$O$_3$ PROTECTIVE COATINGS ON ALUMINIDE SUBSTRATES

This application is a Continuation-In-Part of U.S. Ser. No. 09/703,239, filed Oct. 31, 2000 now U.S. Pat. No. 6,599,636.

BACKGROUND OF THE INVENTION

The present invention relates to processes for forming barrier layers on metal surfaces. It finds particular application in conjunction with forming barrier layers on titanium and aluminum containing substrates, particularly titanium aluminides, which resist oxidation, resist corrosion, resist wear and abrasion, and resist corrosive media.

Titanium aluminide is currently being investigated to replace superalloys for use in aircraft turbine engines and aircraft structures. Titanium aluminide is about half the density of superalloys of comparable strength, so a large reduction in aircraft weight is possible. The titanium aluminide alone is quite brittle, but workers have been able to add other elements to reduce this brittleness. A remaining development problem is that the oxidation resistance of these titanium aluminide compounds is lower than desired at elevated temperature. Therefore, a key factor in increasing the maximum use temperature is the enhancement of oxidation resistance while maintaining creep and strength performance.

Previous attempts to develop a protective coating have resulted in coatings that are unstable or tend to peel off. If a titanium aluminide substrate is oxidized in air or oxygen at high temperature, as is conventionally done, Al$_2$O$_3$ and TiO$_2$ are formed. These two oxides have different structures and are immiscible in each other. As such, the mixed oxide is porous and weakly bonded to the substrate. Therefore, they are subject to spallation from the substrate. As such, the oxides are not an effective oxygen barrier. This is, they do not prevent the diffusion of oxygen into the substrate and the reaction of oxygen with aluminum, titanium, and other elements below the surface.

The present invention relates to a new and improved technique for forming a strongly-bonded surface barrier and overall mixed-oxide protective coating for titanium aluminide substrates, which overcomes the above-referenced problem, and to the structures produced by such a technique.

SUMMARY OF THE INVENTION

In accordance with one aspect of the present invention, a process for forming a specific reactive element barrier on a titanium and aluminum containing substrate is provided. The process includes creating a dry air atmosphere with a concentration of water vapor below about 750 ppm at a temperature above about 550° C. contiguous to a surface of the substrate on which the barrier layer is to be formed. The temperature is maintained above 550° C. and the water vapor concentration is maintained below about 100 ppm while the water vapor in the dry air atmosphere is reacted with specific reactive elements at the substrate surface. The reaction forms a specific reactive element oxide barrier layer which is strongly bonded to the substrate surface. The barrier layer includes an aluminum oxide layer at the substrate/barrier layer interface and a second oxide layer at a barrier layer/atmosphere interface.

In another aspect of the present invention, a process for forming a specific reactive element bilayer on a titanium aluminide substrate is provided. The process includes creating a gaseous/water vapor atmosphere with a concentration of water vapor below about 750 ppm at a temperature above about 550° C. contiguous to a surface of the titanium aluminide substrate on which the barrier layer is to be formed. While maintaining the temperature above about 550° C. and water vapor concentration below about 750 ppm, the oxygen of the water vapor is reacted with specific reactive elements at the titanium aluminide substrate surface until (i) α-Al$_2$O$_3$ is formed directly on the substrate surface in preference to titanium oxide to form a crystalline α-Al$_2$O$_3$ layer at a substrate/barrier layer interface; (ii) titanium atoms from titanium oxide are reduced with aluminum and the titanium atoms diffuse outward through the α-Al$_2$O$_3$ layer; and (iii) oxidizing the titanium atoms that have diffused through the α-Al$_2$O$_3$ layer to form a crystalline Ti$_2$O$_3$ layer at a barrier layer/gas interface the crystalline α-Al$_2$O$_3$ and Ti$_2$O$_3$ have like lattice structures. The substrate and the α-Al$_2$O$_3$ and Ti$_2$O$_3$ layers are then exposed to atmospheric air with a water vapor content above 750 ppm at a temperature greater than about 500° C. to react with the remaining titanium atoms to form TiO$_2$ fibers.

In yet another another aspect of the present invention, a barrier layer protected titanium aluminide material substrate is provided. The barrier layer includes a crystalline α-Al$_2$O$_3$ layer bonded to a surface of the titanium aluminide substrate, a crystalline Ti$_2$O$_3$ layer bonded to the α-Al$_2$O$_3$ layer and crystalline TiO$_2$ fibers in the α-Al$_2$O$_3$ and Ti$_2$O$_3$ layers.

One advantage of the present invention is that it provides a barrier that is resistant to permeation by oxygen.

Another advantage of the present invention is that the process may be carried out in a very low hydrogen atmosphere.

Another advantage of the present invention is that it forms a self-healing surface. If an object strikes the mostly titanium oxide surface and causes removal of a portion of the titanium oxide, titanium will diffuse from the substrate and form oxides to restore the protective surface.

Another advantage of the present invention is that it forms a barrier that resists wear.

Still another advantage resides in the strong adhesion of the barrier layer to a titanium aluminide substrate.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
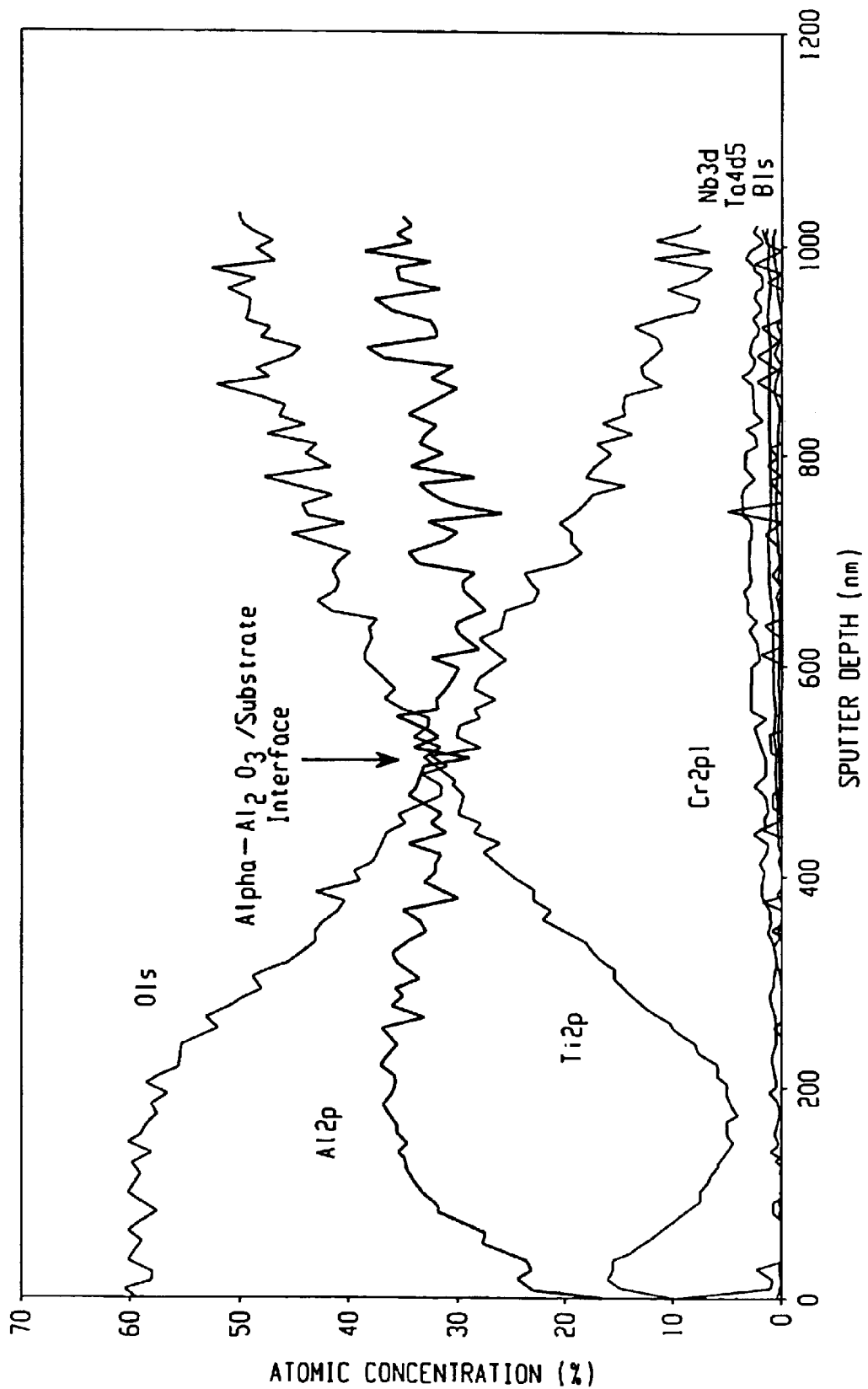
FIG. 1 is an ESCA (electron spectroscopy for chemical analysis) depth profile demonstrating changes in the concentration of titanium, as Ti$_2$O, and aluminum, as α-Al$_2$O$_3$, with depth from the α-Al$_2$O$_3$/substrate interface.

The present application describes the structure and formation of a reactive barrier on the surface of a titanium aluminide substrate. A higher concentration of the specific reactive elements is brought to the surface, and a highly stable oxide of the specific reactive element is formed on the surface of the titanium aluminide substrate. The preferred specific reactive elements include aluminum, titanium, and mixtures thereof.

In one embodiment, the reactive barrier coating is formed on the surface of the titanium aluminide substrate in a low water vapor. Preferred environments include inert environments such as argon, helium, and mixtures thereof. The substrate is heated to an elevated temperature, preferably between about 870 and about 1050° C., in an environment substantially free of free hydrogen gas, with a partial pressure of water vapor, preferably about 1 to about 750 ppm, and more preferably between about 20 to about 100 ppm. The temperature is preferably between about 550 and about 1100° C. Aluminum and titanium atoms are exposed to the oxygen produced by dissociation of the water vapor. The hydrogen atoms produced by the dissociation of the water vapor preferably reduce the non-specific reactive element oxides on the surface of the substrate, thereby exposing more oxygen atoms. Aluminum and titanium atoms react with oxygen to produce strong, stable aluminum and titanium oxides. These specific reactive element oxides are too stable to be reduced by the water vapor and residual hydrogen in the atmosphere.

The Two-Step Process

Formation of the protective oxide may be at least a two-step process. The first step is the formation of mixed $\alpha\text{-}Al_2O_3$ and $Ti_2O_3$ oxides that form about a 5000 Å thick coating with a very strong $\alpha\text{-}Al_2O_3$/substrate bond. The second step forms a much thicker oxide (of the order of 45–50 micrometers) that is grown by heating the product of the first step in high-temperature air, preferably in a temperature range between about 800° C. and 1050° C. The oxide/substrate bond strength at the conclusion of the second step maintains the same high bond strength as achieved by the first step-usually greater than 15,000 psi.

In one embodiment of the present invention, the $\alpha\text{-}Al_2O_3$ reactive barrier coating is formed on the surface of the titanium aluminide during the above-described first step process in a low-hydrogen environment. The $\alpha\text{-}Al_2O_3$/substrate bond is very strong, on the order of about 10,000 to about 15,000 psi. The substrate is heated to an elevated temperature, preferably between about 870 and about 1050° C., in an environment substantially free of hydrogen, with a partial pressure of water vapor, preferably about 1 to about 750 ppm, and more preferably about 20 to about 100 ppm. The range of temperature is between about 550 and about 1100° C. At these temperatures and pressures, all non-specific reactive elements on the surface are reduced. As the less stable surface oxides are reduced by the water vapor in the gaseous atmosphere, aluminum and titanium atoms are exposed to the fresh oxygen produced by the dissociation of the water vapor and from the dissociation of less stable surface metal oxides which have formed on the substrate. Aluminum atoms, dominant oxide formers in this environment in comparison to titanium, react with oxygen to form crystalline $\alpha\text{-}Al_2O_3$ that strongly bonds to the titanium aluminide substrate. Any titanium oxide formed will be reduced by aluminum while in close proximity to aluminum. The titanium atoms diffuse through the $\alpha\text{-}Al_2O_3$ coating and form an intermediate oxide, $Ti_2O_3$. The crystalline $\alpha\text{-}Al_2O_3$ acts as a template for the formation of crystalline $Ti_2O_3$ because both molecules have the same crystal configuration and nearly the same lattice parameters.

The $\alpha\text{-}Al_2O_3$/substrate interface bond remains very strong, in excess of about 10,000 psi to about 15,000 psi, during all stages of processing as measured by a "stud pull" adhesion test. An oxide cohesive strength-measuring instrument, the Stylometer, indicated that the cohesive strength of the mixed $\alpha\text{-}Al_2O_3$ and $Ti_2O_3$ oxides is very strong at the end of the first step.

In an alternate embodiment, the substrate is substantially free of titanium. Preferred titanium free substrates include aluminum containing alloys, superalloys, and compounds. Especially preferred substrates include nickel aluminide, iron-aluminum alloy, and Fe-6Al. When a titanium-free substrate is coated according to the above-described first step, the resultant coating is a substantially pure $\alpha\text{-}Al_2O_3$ barrier layer. An $\alpha\text{-}Al_2O_3$ protected Fe-6Al substrate offers a broad range of applications in the wrought iron industry as a low-cost, stainless iron for use as heat-shields, exhaust systems for internal combustion engines, gas turbine housings, cookware, grill parts, and furnace burner housings, as well as other wrought iron applications known in the art.

In a second step, the cohesive strength decreases somewhat as $TiO_2$ crystalline fibers begin to form as the titanium aluminide is exposed to atmospheric air with a higher water vapor content at high temperature. However, at the conclusion of the second step treatment in air at high temperature, the mixed oxide ($\alpha$-$Al_2O_3$, $Ti_2O_3$, and $TiO_2$) cohesive strength has recovered to nearly the same strength measured for the mixed $Ti_2O_3$ and $\alpha$-$Al_2O_3$ measured at the end of the first step. Overall, despite the variation in cohesive strength as measured by the Stylometer, the bond strength of all oxide layers exceeded the tensile stress applied by the Stud Pull device at the point of epoxy failure between 10,000 and 15,000 psi.

In a preferred embodiment, very dry air is used. A Whatman Purge Gas Generator, model 74-5041 is used to generate air with a Dew Point temperature of $-100°$ C. that is equivalent to water vapor concentrations of less than about 1 ppm. When the gas is purged into a furnace with leaks to the air atmosphere around the furnace, a Dew Point Temperature between about $-45$ and $-65°$ C. is reached that corresponds to a water ppm range between about 100 and 20 ppm of water. Although there is oxygen present in the dry air, it is the water vapor at these ppm levels that reacts with the titanium and aluminum metal to cause the formation of $\alpha$-$Al_2O_3$ and $Ti_2O_3$ oxides and release of hydrogen from the water molecule. A very low partial pressure of hydrogen is therefore, produced as well. This hydrogen can react with any sulfur present in voids or cavities at the surface so that the oxides can bond readily to the substrate.

The advantage of this latest invention is that a source of hydrogen is not needed and one does not need to fill the furnace with atmospheric pressure hydrogen—a potentially dangerous situation. Furthermore, once the $\alpha$-$Al_2O_3$ substrate interface has been established and a coating of $\alpha$-$Al_2O_3$ and $Ti_2O_3$ formed that is about 5000 Å thick, the dry air flow can be turned off and the surface can continue with normal air in it at the same temperature, "usually of the order of $800°$ C. or so. Once normal air is present in the furnace, with much higher Dew Point, temperature, and water ppm values, $TiO_2$ will begin to form along with the $\alpha$-$Al_2O_3$. $\alpha$-$Al_2O_3$ and $Ti_2O_3$ will continue to grow on top of the $\alpha$-$Al_2O_3$/substrate interface, but $TiO_2$ will grow also, but as $TiO_2$ crystalline fibers that are a couple of micrometers in diameter. The $\alpha$-$Al_2O_3$ and $Ti_2O_3$ matrix is in the form of $(A+Ti)_2O_3$.

Of course, this protective oxide can also be grown on nickel and iron aluminides and upon iron/aluminum alloys such as Fe-6Al—generally on alloys or compounds that do not contain titanium, or contains minimal amounts of titanium, less than 2%.

A typical $\alpha$-$Al_2O_3$/substrate interface is shown in the ESCA depth profile of FIG. 1. The $\alpha$-$Al_2O_3$/substrate interface remains at the original surface of the substrate as the overall protective oxide coating is growing. It becomes a system that creates an $\alpha$-$Al_2O_3$ oxide barrier that prevents diffusion of oxygen into the substrate. It also functions to cause the building of a mixed $\alpha$-$Al_2O_3$, and $Ti_2O_3$ oxide above the interface that eventually becomes a part of the overall protective oxide coating. The interface is not at a particular point, but it is a broad transition region from the near-surface region with fully formed oxides, through a region of partially formed oxides, and finally to metals as shown in FIG. 1.

Figure 2:
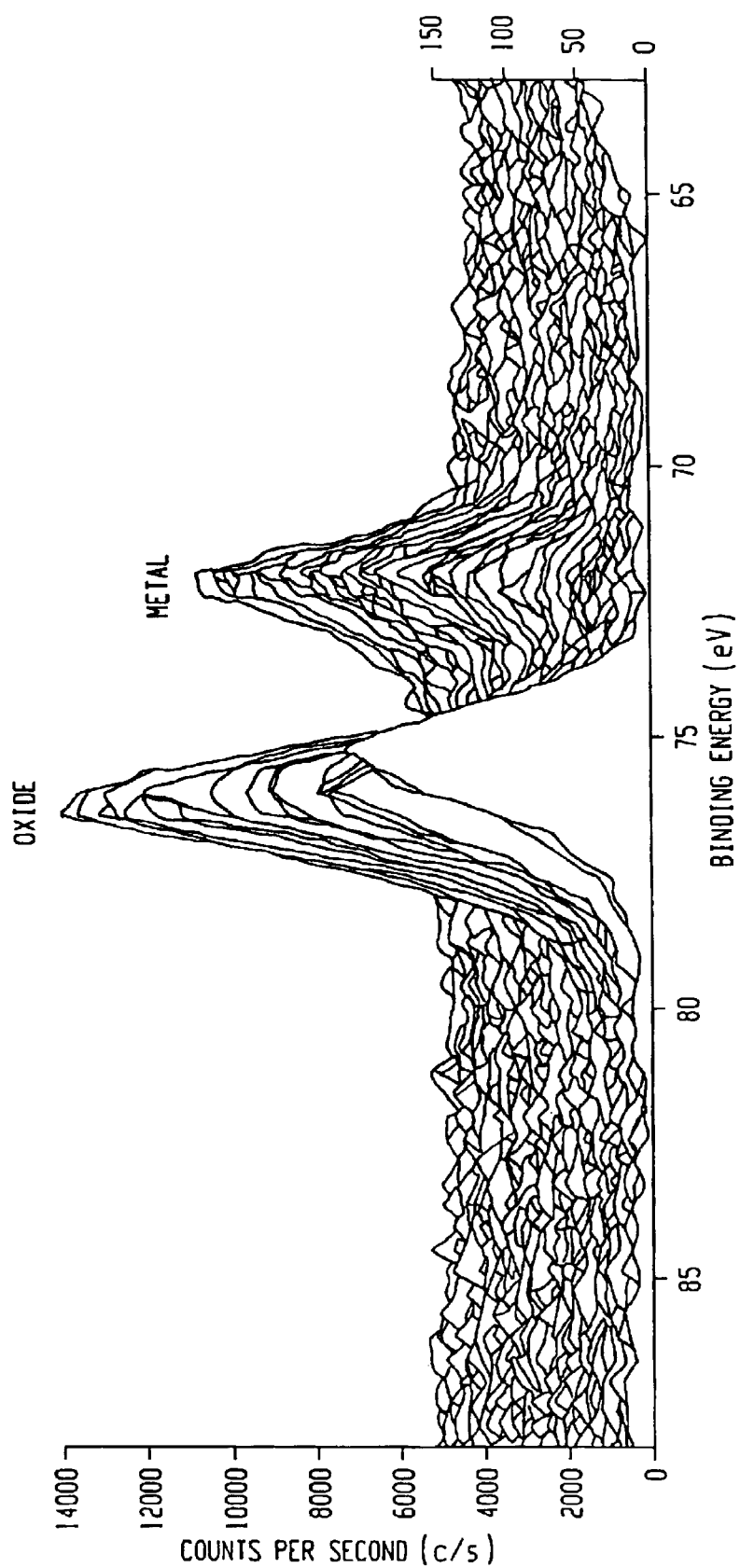
FIG. 2 is a chart of Photoelectron Counts per Second (C/S) vs Binding Energy of aluminum and aluminum oxide The chart indicates where in the interface region aluminum is oxidized and where it is a metal.

With reference to FIG. 2, it is possible to determine where in the interface region an element is oxidized and where it is a metal. FIG. 2, obtained from the ESCA data for FIG. 1, is a chart of Photoelectron Counts per Second (C/S) vs Binding Energy of a specific element, in this case aluminum. The ESCA process consists of the continuous sputtering of material from the oxidized surface of the substrate. While this is occurring, the surface is bombarded with X-rays that cause the emission of photoelectrons from the surface. The photoelectrons are detected and their energy measured. Then, the counts/second of photoelectrons are recorded and plotted as a function of energy. Several such scans (150 on FIG. 2) are taken during the sputtering operation to the full depth of the ESCA profile. Since the binding energy of aluminum oxide is different than that for aluminum, two peaks will occur, each at a different binding energy. It is clear from FIG. 2 that aluminum oxide forms from the surface to the interface region and metallic aluminum forms at greater depth after the interface region. A similar curve can be drawn from data for titanium.

During a first step, the gaseous/water vapor medium causes the aluminum to be the dominant oxide former. At the beginning of formation of the protective oxide coating, $\alpha$-$Al_2O_3$ is first formed on the substrate surface. An $\alpha$-$Al_2O_3$/substrate bond is formed and remains during the entire formation of the protective oxide coating. Titanium atoms will diffuse to the $\alpha$-$Al_2O_3$/substrate interface from the substrate and may form an oxide, but the oxide will be immediately reduced to titanium and oxygen by the aluminum. Since titanium atoms can diffuse faster than aluminum atoms, the titanium atoms diffuse through the $\alpha$-$Al_2O_3$ and again form an oxide, a $Ti_2O_3$ oxide. Without being bound by theory, it is believed that the existing $\alpha$-$Al_2O_3$ crystalline structure acts as a template to form the $Ti_2O_3$. The crystalline structure of $Ti_2O_3$ is the same as $\alpha$-$Al_2O_3$ and the lattice parameters are nearly the same. With the $\alpha$-$Al_2O_3$ firmly bonded to the substrate and titanium atoms diffusing through the $\alpha$-$Al_2O_3$ to form $Ti_2O_3$, a system is in place to cause the growth of a mixed $\alpha$-$Al_2O_3$ and $Ti_2O_3$ oxide between the interface and the surface. In the region between the interface and the surface, $\alpha$-$Al_2O_3$ tends to concentrate near the interface and $Ti_2O_3$ concentrates near the surface with gradients of each between. Typically, about a 5000 Å thick mixed oxide coating is grown during the first step. Very little, if any, $TiO_2$ is formed during the first step.

An ESCA depth profile of the processed specimen from the surface to the interface, and beyond, shows the atomic concentration percentages of oxygen, aluminum, and titanium as a function of depth. If, at a particular depth, one adds the aluminum and titanium percentages together, a structure combines as $(Al+Ti)_2O_3$. This indicates that the driving force that establishes the gradient that causes the diffusion of titanium and aluminum toward the surface from the substrate is the formation of $\alpha$-$Al_2O_3$ and $Ti_2O_3$, or as combined, $(Al+Ti)_2O_3$. This fact can be demonstrated with FIG. 1, between the surface and about 200 nanometers, by adding the atomic percentages of aluminum and titanium (Al+Ti) and combining with the atomic percentage of oxygen to form $(Al+Ti)_2O_3$.

After formation of the approximately 5000 Å thick mixed oxide of the first step is completed, the adhesive strength of the $\alpha$-$Al_2O_3$/substrate bond and the cohesive strength of the mixed oxide may be evaluated. A "stud pull" device, attached to the oxide by epoxy, applies a tensile force perpendicular to the plane of the oxide to try to pull the coating from the substrate. In substantially all cases, the adhesive strength of the oxides formed by the present process exceeds the limit of the device. That is, the bond strength of the oxide to a particular titanium aluminide specimen is greater than the cohesive strength of the epoxy—in this case 13,800 psi—but generally can vary between about 10,000 and about 15,000 psi. A Stylometer, a scratch-type device, is a good instrument to evaluate the cohesive strength of the mixed oxide coating. A load is continually applied to a small diameter, hemispherical diamond that is moved across the surface of the oxide as the load, in pounds, is continually applied to the diamond. After processing a titanium aluminide specimen coated by the present process in the above-described first step, a load of 7.21 pounds was applied to the specimen, through the diamond, to cause failure by cracking and chipping. The 7.21 pounds applied to the diamond is equivalent to a tensile force that is greater than that required to cause the cohesive failure of the epoxy—greater than about 10,000 to about 15,000 psi failure point of the epoxy. In the testing done, specimens processed in accordance with the above-described method passed the "stud pull" test.

The preferred first-step process heats the titanium aluminide specimens in a gaseous atmosphere that contains between about 1 and about 500 ppm of water vapor. Some substrates may take up hydrogen at lower temperatures. Therefore, in cases where a hydrogen atmosphere is utilized, the hydrogen atmosphere is evacuated from the furnace after processing the substrates in the temperature range of about 870° and 1050° C., and upon cooling the furnace down to about 815° C., and the cool down process is continued in a vacuum that contains less than 1 ppm of water vapor. Alternatively, the furnace is backfilled with an inert gas that contains less than 1 ppm of water vapor as the furnace is cooled to room temperature.

A second step of the present process includes heating a titanium aluminide specimen in air at a high temperature, in a range between about 800° C. and about 1050° C., after the specimen has been processed in the above-described first step. After a 1000-hour exposure of the titanium aluminide specimen in air at high temperature, the specimen still exceeded the limits of the "stud pull" tensile tester. A Stylometer surface tester measured cohesive failure of the mixed oxide at 5.13 pounds. As will be shown, the metals have not quite reached the desired nearly fully oxidized condition. When this condition is reached, it is likely that a Stylometer test will reveal a load closer to the 7.21-pound value.

Figure 3:
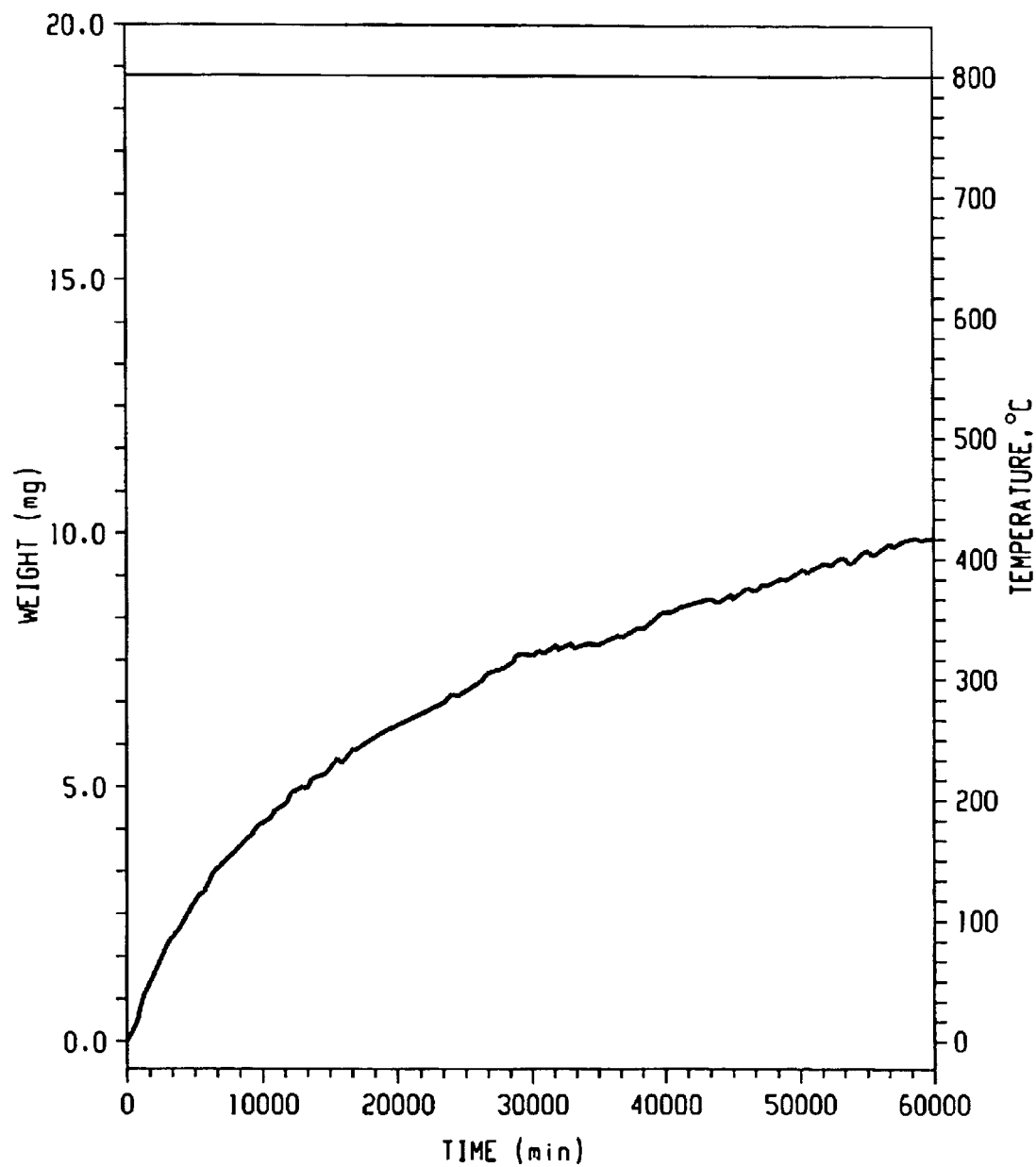
FIG. 3 is a Thermogravimetric Analyzer chart showing the take-up of 10 mg of oxygen by a titanium aluminide specimen after a 1000-hour exposure to air at 800° C.
Figure 4:
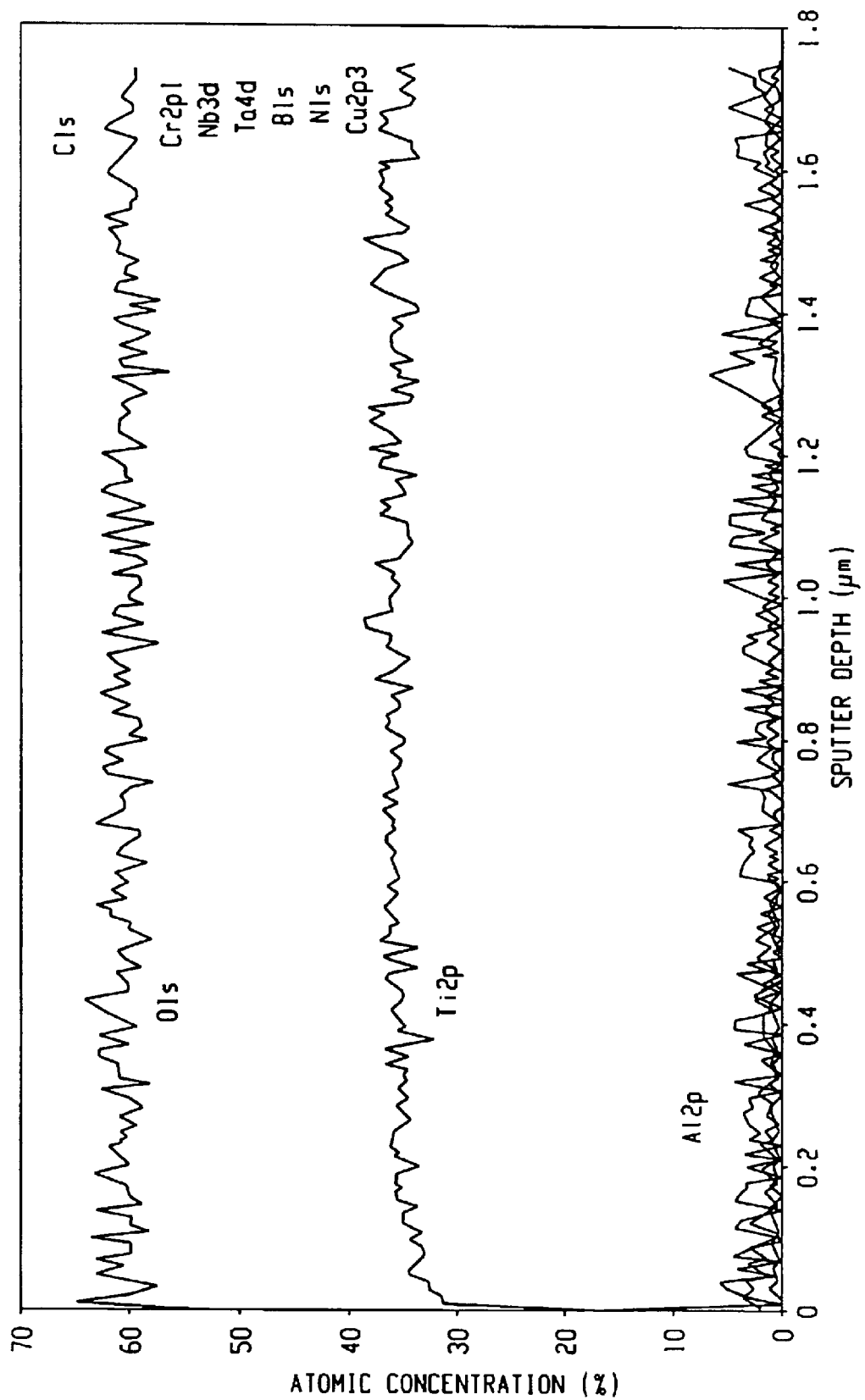
FIG. 4 is an ESCA depth profile of a titanium aluminide specimen to a depth of 1.7 μm showing the atomic concentration percentages of oxygen and titanium as a function of depth after the step-one process followed by the step-two processing in air for 1000 hours at 800° C.

After the second-step, a strong $\alpha$-$Al_2O_3$/substrate bond strength as indicated by the "stud pull" tester and a strong cohesive strength of the mixed oxide as indicated by the Stylometer is also validated by other instrumentation. A titanium aluminide specimen placed in a Thermogravimetric Analyzer during the 1000-hours in air at 800° C. shows a take-up of oxygen of 10 mg as indicated on FIG. 3. During this time, the rate of oxygen take-up was decreasing rapidly and should nearly cease in a few more hours. This means that the region between the surface and interface of the titanium aluminide specimen was approaching a fully oxidized condition. The surface to 1.7-$\mu$m region of a specimen that was heated to 800° C. for 1000 hours is shown in FIG. 4. This region contains mostly titanium and oxygen and very little aluminum. If the atomic percentages of oxygen and titanium are added, the result indicates that a mixture of $Ti_2O_3$ structure (60% oxygen, 40% titanium) and $TiO_2$ structure (67% oxygen, 33% titanium) is present. The actual percentage of about 35% titanium indicates that some of the titanium is $Ti_2O_3$ and some has combined with oxygen as $TiO_2$. This combined structure appears to provide a high cohesive strength as measured by the Stylometer.

Figure 5:
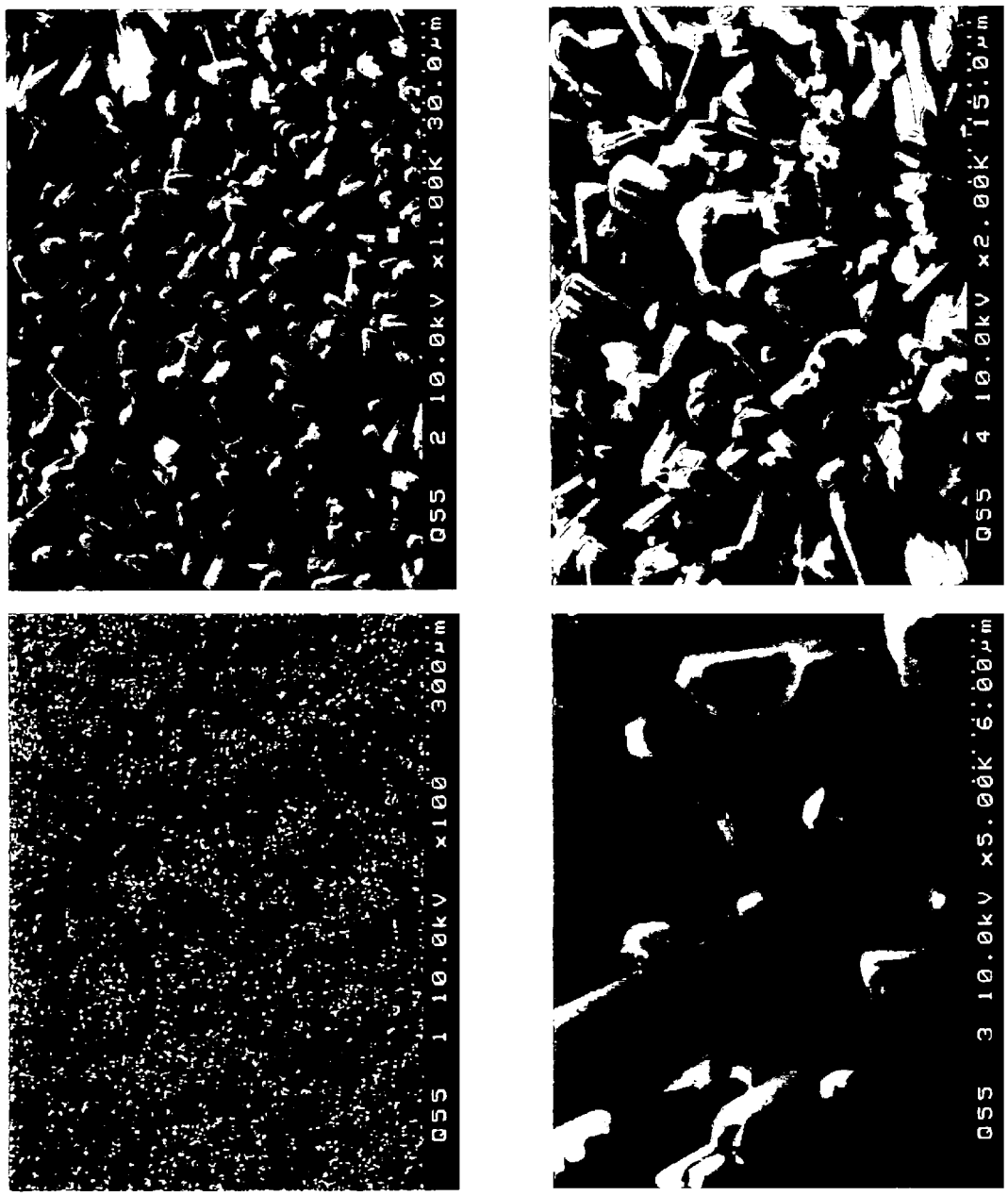
FIG. 5 shows SEM (scanning electron microscope) photographs of a titanium aluminide (Gamma-Met) specimen that has been processed according to the first step of the present invention and then heated in air for 1000 hours to 800° C. to nearly fully oxidize the region between the surface and the interface. The surface is covered with $TiO_2$ fibers.

Only $\alpha$-$Al_2O_3$ and $Ti_2O_3$ were formed in the first step process. In air, titanium is capable of oxidizing $Ti_2O_3$ to form $TiO_2$ as micrometer diameter crystalline fibers. The $(Al+Ti)_2O_3$ crystalline matrix extends the full depth of the mixed oxide thickness with varying amounts of aluminum and titanium atoms present. The $TiO_2$ fibers are embedded in this matrix. FIG. 5 shows SEM photographs of a titanium aluminide specimen that has completed the first step process and was then heated to 800° C. for 1000 hours to nearly fully oxidize the region between the surface and the interface. The surface is covered with fibers of $TiO_2$. Some fibers are perpendicular to the plane of the substrate surface. Some fibers are at certain angles to the plane of the substrate surface. Other SEM data shows that the $TiO_2$ fibers are embedded in a matrix of $(Al+Ti)_2O_3$. Without being bound by the theory, it is believed that the titanium atoms diffuse within the lattice by substitutional diffusion-jumping from lattice site to lattice site. This is a very rapid method for the diffusion of titanium. Thus, a dynamic system exists for transporting titanium from the substrate to form $Ti_2O_3$ as well as the $TiO_2$ crystalline fibers. This system makes possible the later-described self-repair of the mixed oxide structure if some object should strike the surface and cause the removal of some of the coating during processing, as long as the $\alpha$-$Al_2O_3$/substrate interface is not damaged. The $TiO_2$ fibers that grow perpendicular to the plane of the substrate serve to strengthen the matrix of $(Al+Ti)_2O_3$. The surface measurement conducted by the Stylometer instrument suggests that this is indeed so. As mentioned previously, such a measurement of 5.13 pounds indicates that the cohesive strength of the mixed oxide is very strong.

The appearance of the $TiO_2$ fibers protruding upward from the surface suggests several possibilities. A Thermal Bonding Coat (TBC) should attach quite readily to such a surface. In an aerodynamic application, the fiber-covered surface should create a uniform boundary layer for a flowing gas. Radar reflected from the surface will probably scatter in all direction—making the identification of an aircraft using this coating much more difficult. The surface will probably have a high absorbance at certain visible light frequencies that may be an important attribute in some applications.

Thus far, the second-step process has been described with reference to a 1000-hour test. Changes in parameter values for each of the first and second steps may result in a faster or slower process time. In many applications, the period of time needed to form the oxide in the second processing step is of little importance. For example, if the titanium aluminide component, after the first step, is installed in an aircraft engine where it is heated to 800° C., or higher, the final protective oxide coating will form in air just as it did in a furnace. ASC data indicates that the protective oxide improves with time.

Figure 6:
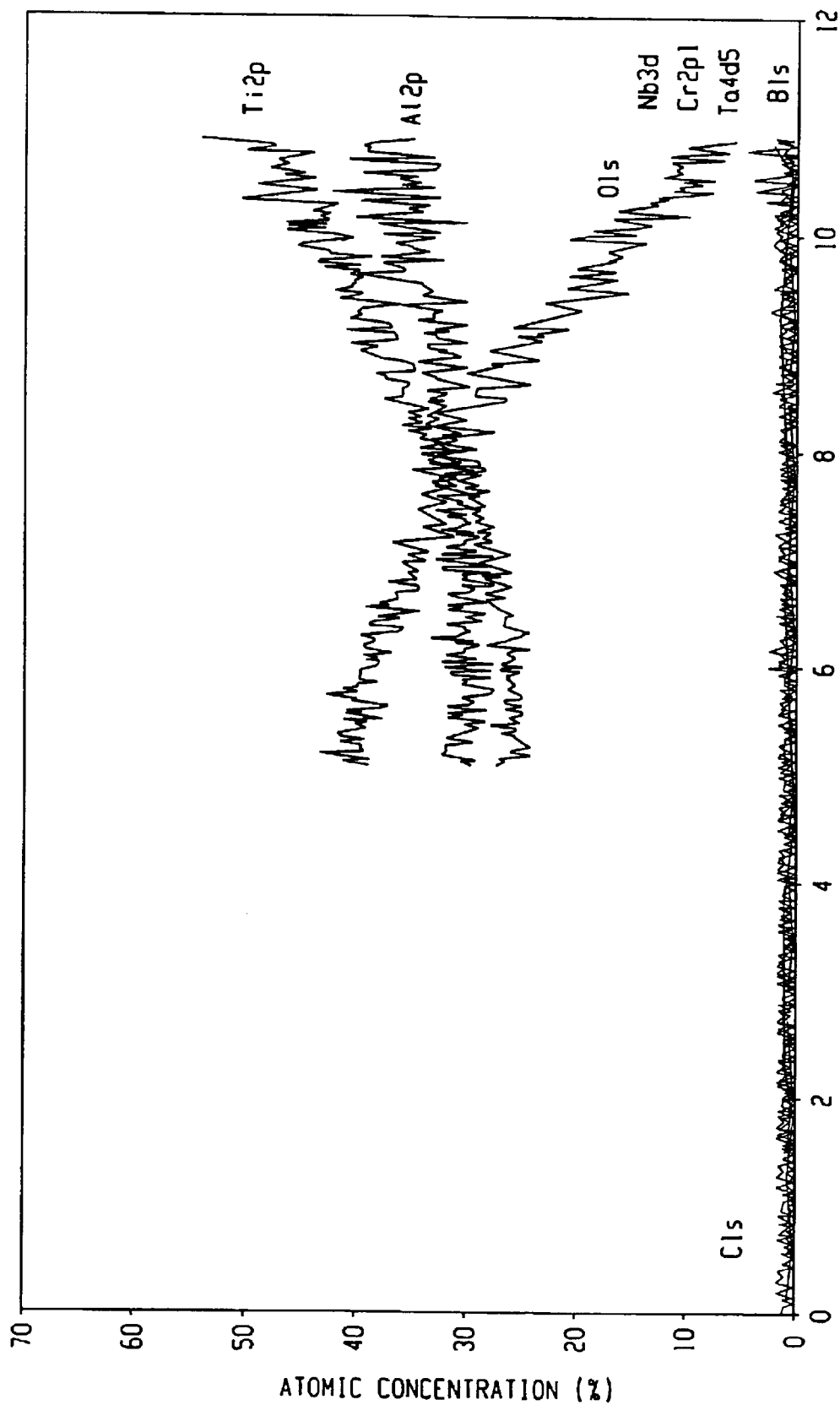
FIG. 6 is an ESCA depth profile of a titanium aluminide specimen after the first step has been completed and the second step is carried out in air for 45 hours at 800° C.
Figure 7:
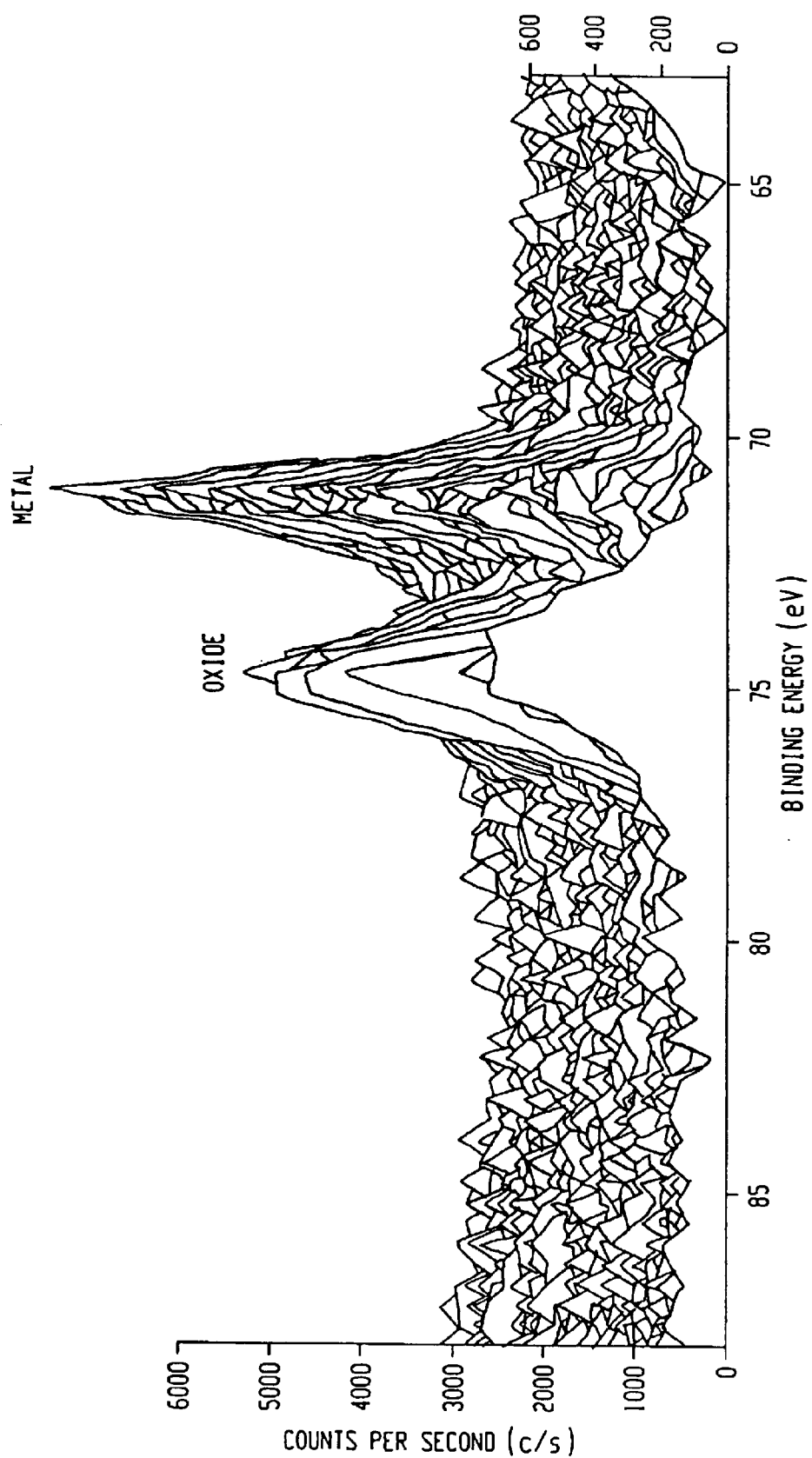
FIG. 7 is an ESCA Photoelectron C/S vs Binding Energy Chart for aluminum in a similar manner to FIG. 2, showing where in the depth profile aluminum is oxidized and where it is a metal.

It is informative to note that the $\alpha$-$Al_2O_3$/substrate interface functions the same way regardless of how thick an oxide has grown in front of it. For example, when the data from the first step process is compared with the data from a 45-hour test in air at 800° C., the $\alpha$-$Al_2O_3$/substrate interface originally formed during the first step (FIG. 1) still exists after the specimen has been processed in air for 45 hours at 800° C. (FIG. 6). It is also clear in FIG. 7 that the $\alpha$-$Al_2O_3$/substrate interface functions the same as it did in FIG. 2 to allow separation of the aluminum oxide from the aluminum metal. Moreover, regardless of how thick an oxide is grown on top of the $\alpha$-$Al_2O_3$/substrate interface, the interface functions in the same manner. The $\alpha$-$Al_2O_3$/substrate interface shown in FIG. 6 looks the same as the interface shown in FIG. 1 after a 1000-hour in air at 800° C., but the interface in FIG. 6 has an 8 $\mu$m thick oxide grown on top of it and the one in FIG. 1 has only a 5000 Å thick oxide grown on top of it.

Figure 8:
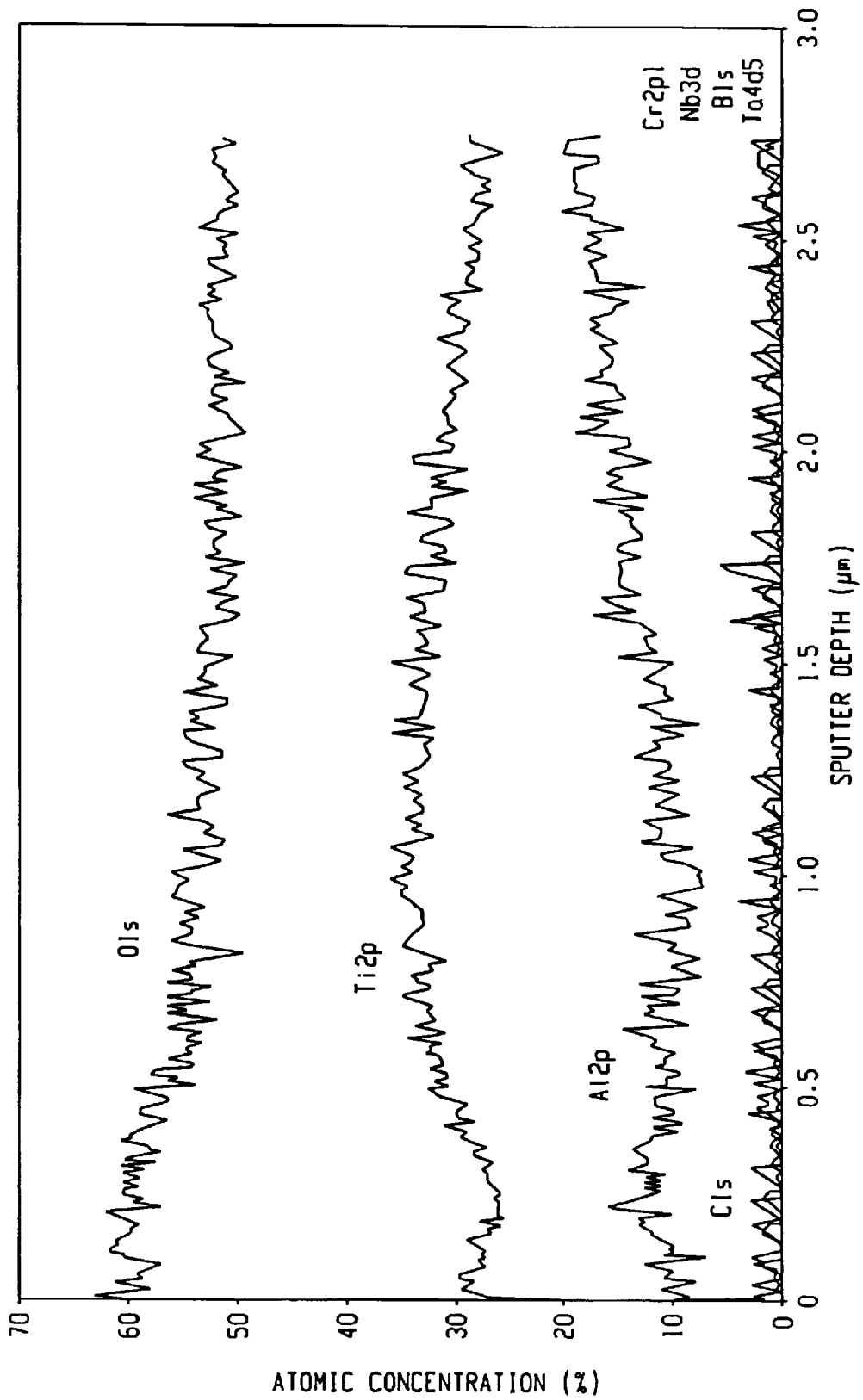
FIG. 8 is an additional ESCA depth profile of a titanium aluminide specimen after step-one processing followed by step-two processing in air for 45 hours at 800° C.
Figure 9:
FIG. 9 shows SEM photographs of a titanium aluminide specimen that has been processed in a similar manner to FIG. 5. A partial coverage of $TiO_2$ fibers is shown that are embedded in an $(Al+Ti)_2O_3$ matrix.
Figure 9:
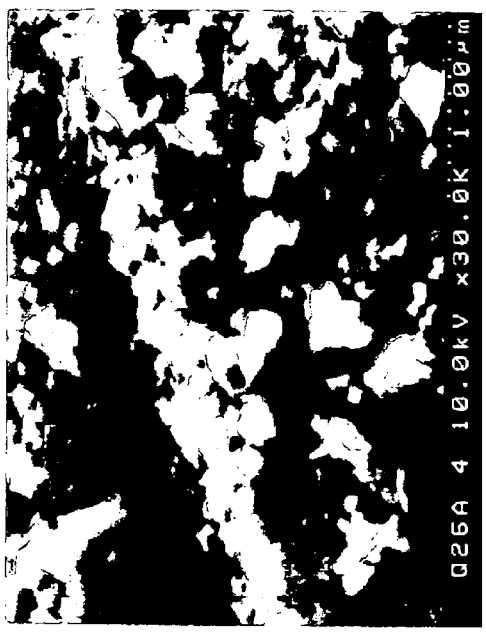
Figure 9:
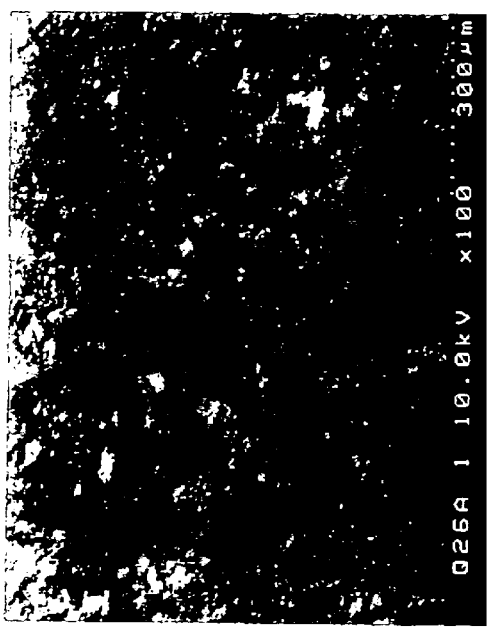
Figure 9:
Figure 10:
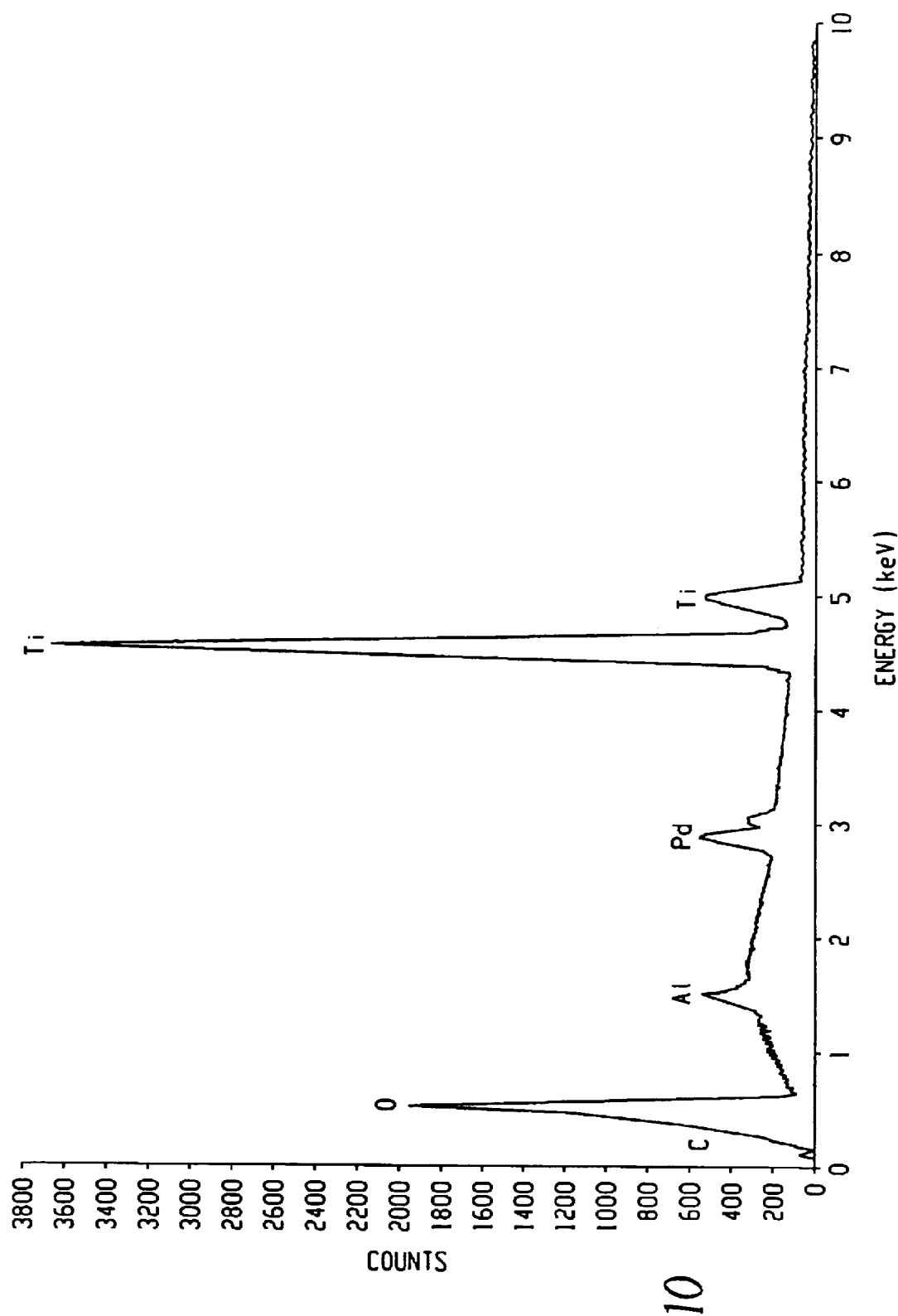
FIG. 10 is an EDS (energy dispersive spectrometer) spectrum that identifies the fibers shown in FIG. 9 as $TiO_2$.
Figure 11:
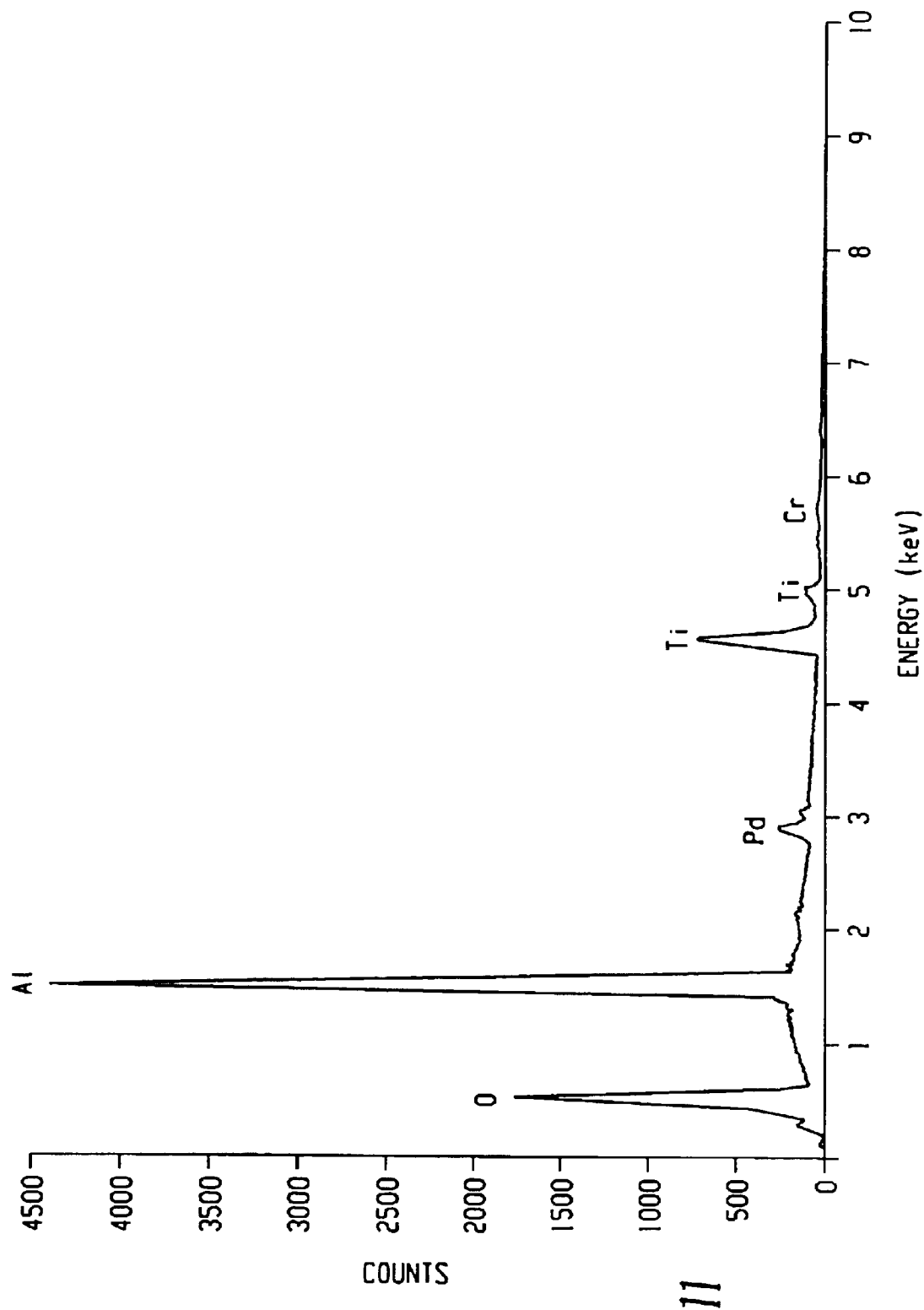
FIG. 11 is an EDS spectrum that identifies the matrix background of FIG. 9 as $(Al+Ti)_2O_3$.

An ESCA depth profile from the surface to about 2.7 µm, shown in FIG. 8, was performed after a titanium aluminide specimen, processed in the first step, was heated in air for 45 hours at 800° C. If the atomic percentages of aluminum and titanium are added and combined with oxygen, it becomes apparant that a $(Al+Ti)_2O_3$ structure exists. FIG. 9 shows an SEM photograph of the surface of this specimen. $TiO_2$ fibers are clearly seen as patches on a matrix of $(Al+Ti)_2O_3$. Fibers are marked with "A" which indicate that an EDS analysis was taken of the fibers. The EDS spectra of FIG. 10 identifies the fibers as $TiO_2$. The background matrix marked with "B" is identified by the EDS spectra shown as FIG. 11. It is clear when looking at FIG. 9 that the oxidation is not complete, especially if one compares FIG. 9 with the SEM photograph of FIG. 5 that was taken after 1000 hours in air at 800° C. The latter photo shows complete coverage of the surface with $TiO_2$ fibers. It is clear that after 45 hours at 800° C. the oxidation is incomplete between the surface and the interface.

Figure 12:
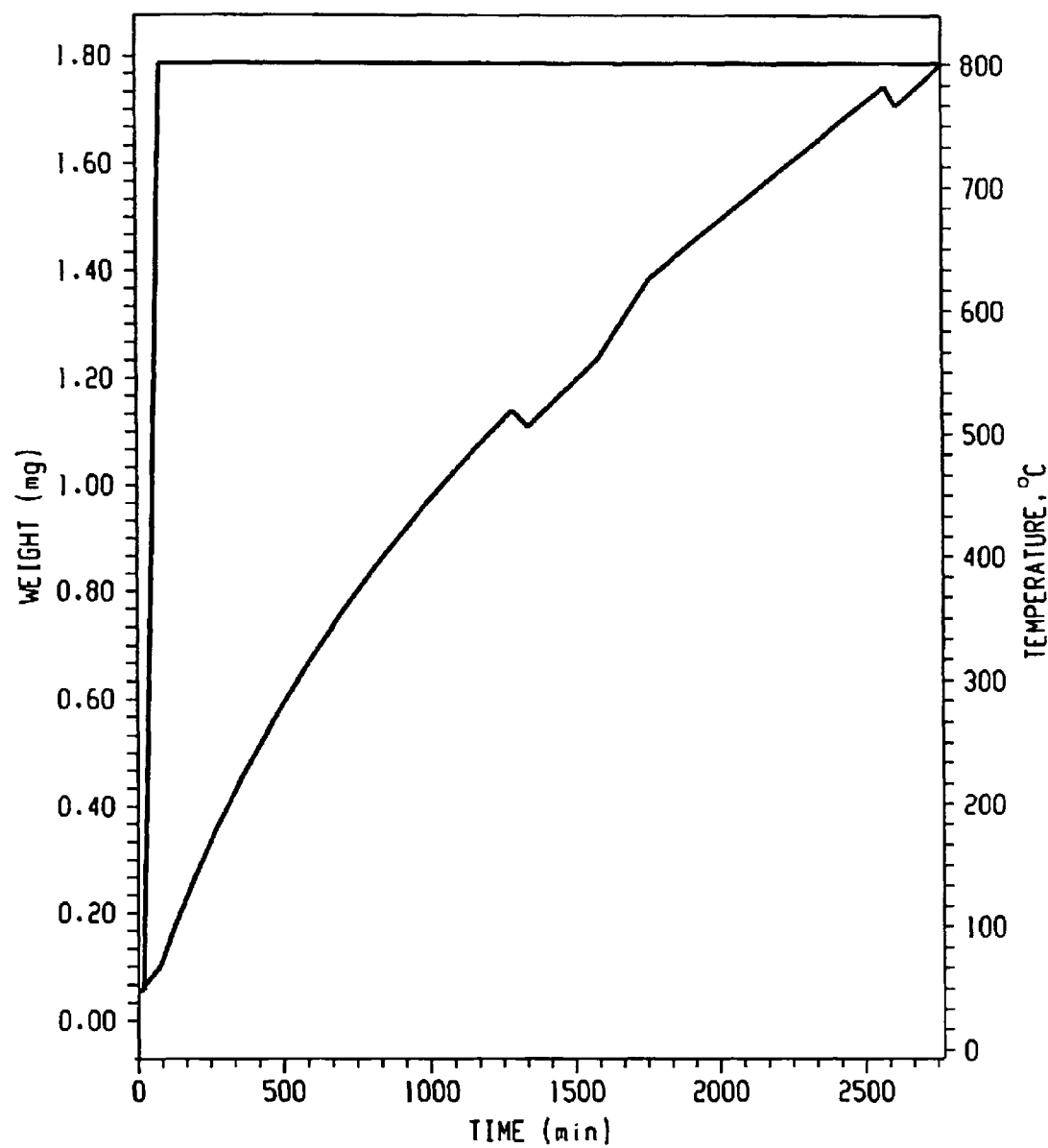
FIG. 12 shows a Thermogravimetric Analyzer chart that indicates a take-up of 1.77 mg oxygen by a titanium specimen after processing in a manner similar to FIG. 3.

Of perhaps more importance is a comparison of the Stylometer test results for each case. As stated above, the Stylometer measurement after the 1000-hour test at 800° C. resulted in a reading of 5.13 pounds, indicating very strong cohesive strength of the oxide. The Stylometer measurement after the 45-hour test resulted in a reading of 2.30 pounds, the cohesive strength of the oxide is considerably lower, is an indication of incomplete oxidation. This difference in cohesive strength of the growing mixed oxide can also be validated by the results of the Thermogravimetric Analyzer after the 45-hour test at 800° C. FIG. 12 shows that a take-up of only 1.77 mg of oxygen had taken place. This is only about 18% of the oxygen taken up by the specimen heated in air at 800° C. for 1000 hours (FIG. 3).

For all of the titanium aluminide (Gamma-Met) specimens processed by the first step process, containing only $\alpha$-$Al_2O_3$ and $Ti_2O_3$ but little or no $TiO_2$, all had measured $\alpha$-$Al_2O_3$/substrate bond strengths that exceeded 10,000 psi as measured by the "stud pull" test. At the end of the first step process, the cohesive strength of the mixed $\alpha$-$Al_2O_3$ and $Ti_2O_3$ oxides was 7.21 pounds, as measured by a Stylometer. After the titanium aluminide specimen completed the first step and was heated in air at about 800° C. for a number of hours during the second step process, the cohesive strength of the mixed oxides, as measured by the Stylometer, decreased from 7.21 pounds to 2.30 pounds after a heating time of 45 hours as the $TiO_2$ crystals began to grow in a background matrix of $\alpha$-$Al_2O_3$ and $Ti_2O_3$. After a time of 1000 hours at about 800° C., the cohesive strength increased to 5.13 pounds. The cohesive strength of the $\alpha$-$Al_2O_3$ and $Ti_2O_3$ mixed oxides decreases somewhat in the air environment as a new compound, $TiO_2$, begins to form, and then increases as the full protective oxides ($\alpha$-$Al_2O_3$/$Ti_2O_3$/$TiO_2$) are formed. Despite this variation of cohesive strength as measured by the Stylometer, the bond strength of each oxide layer always exceeded the tensile force applied by the Stud Pull device as the epoxy reached its failure point (usually between about 10,000 and about 15,000 psi).

Figure 13:
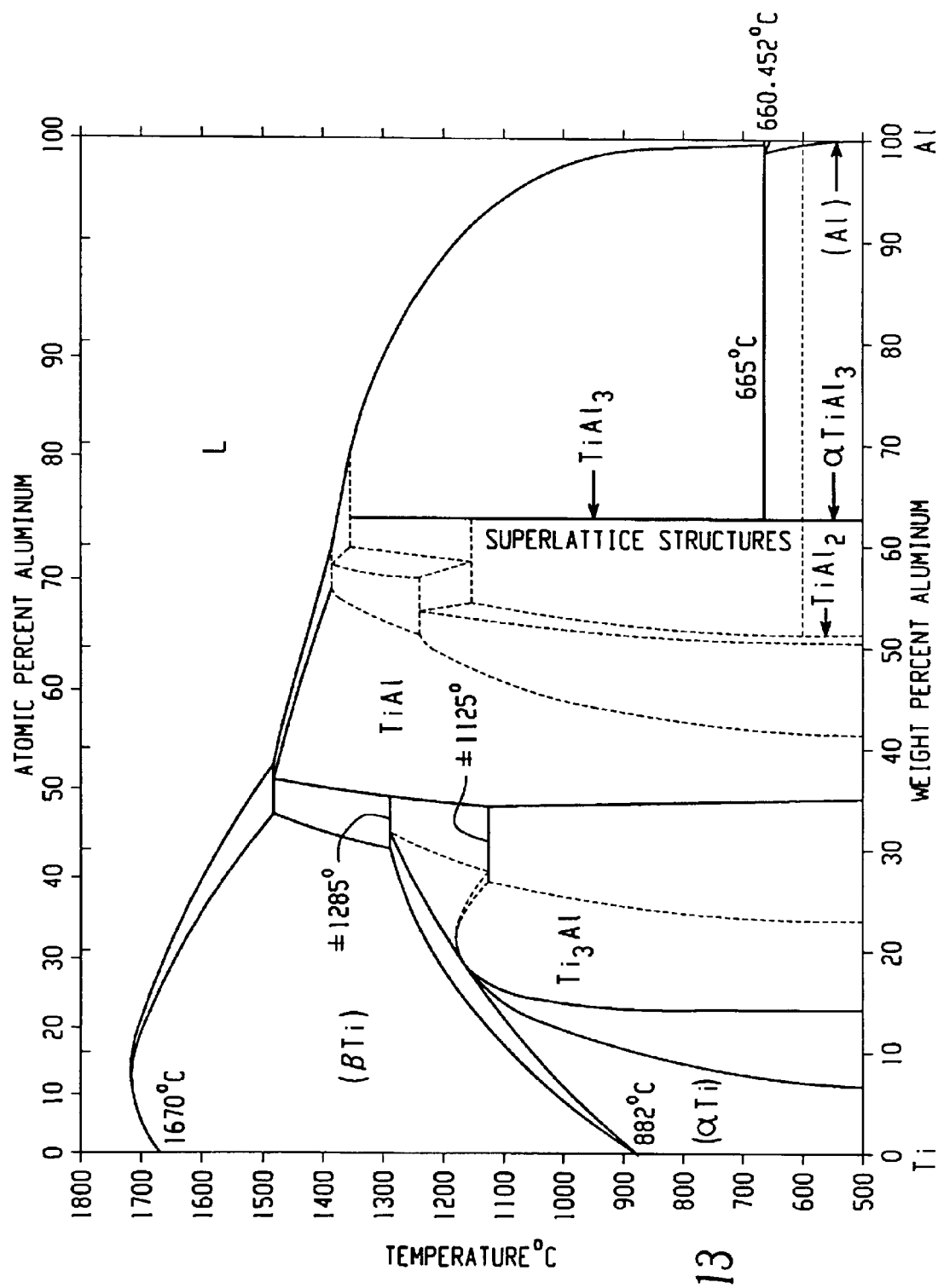
FIG. 13 is a Ti—Al phase diagram, giving a graphic description of the weight percent (atomic percent) of aluminum vs temperature (° C.) in typical Ti—Al substrates.

The above-described two-step process for forming a protective layer on titanium aluminide substrates can also function as a self-repair process for titanium aluminide substrates. If a coating is damaged, during the process stage, the coating will immediately begin re-forming in the gaseous/water vapor atmospere through the same two-step process. In one embodiment of the present invention, the substrate upon which the reactive barrier is formed is a titanium aluminide substrate. The phase diagram of titanium aluminides is shown in FIG. 13. As can be seen, titanium aluminide substrates have attractive elevated-temperature properties and low density typical of intermetallic compounds. These attributes make titanium aluminide materials very interesting for both engine and airframe applications. These advanced materials are key to technological advancements, and enhanced structural materials are particularly vital to advanced aerospace systems.

Intermetallic compounds, such as titanium aluminide, are defined as having an ordered alloy phase between two metallic elements. An alloy phase is ordered if two or more sublattices are required to describe its atomic structure. The ordered structure of intermetallic compounds exhibits attractive elevated-temperature properties, i.e. strength, stiffness, etc., because of the long-range ordered super-lattice that reduces dislocation mobility and diffusion properties at elevated temperature. The reduced dislocation motion also results in fracture toughness at extremely low ambient temperature.

The immediate process of forming protective oxide coatings on titanium aluminides is effective for all aluminide compounds. This includes the phases $\beta$-Ti, $Ti_3Al$, $\gamma$-TiAl, and $TiAl_3$. Because of their low density, the ordered intermetallic titanium aluminides, especially $\gamma$-titanium aluminide ($\gamma$TiAl) and $\alpha$-2-titanium aluminide ($Ti_3Al$), are particularly attractive candidates for applications in advanced aerospace engine and airframe components, in both monolithic and composite concepts. A comparison of the characteristics of monolithic titanium aluminides with other aluminides and superalloys is shown in Table

TABLE 1

Melting Points and Densities for Aluminides

| Aluminide | Melting Point (° C.) | Density (gm cm$^{-3}$) |
| --- | --- | --- |
| $Ti_3Al$ | 1600 | 4.2 |
| TiAl | 1460 | 3.9 |
| $Fe_3Al$ | 1540 | 6.7 |
| FeAl | 1330 | 5.6 |
| $Ni_3Al$ | 1390 | 7.5 |
| NiAl | 1640 | 5.9 |
| Superalloys (typical) | 1325–1400 | 9 |

In a preferred embodiment, the titanium aluminide substrate is $\gamma$-TiAl, that has been modified by the addition of other elements to improve the mechanical properties of the aluminide substrate. The modified $\gamma$-TiAl has a melting point of about 1460° C., a temperature well above the process temperature required to form the protective oxide coatings of the present invention.

Also preferred are titanium aluminide ternary alloys consisting of Ti—Al—X, where X can be elements such as Cr, Nb, Mn, Mo, W, and V. Some examples of these titanium aluminide ternary alloys are Ti-49Al-2W (atomic %),Ti-44Al-2Mo, Ti-47191-29V, and Ti—Al—Nb—Y where Y equals Cr or Mn. In general, the processes for forming oxide barrier layers on titanium and aluminum containing substrates relates to all titanium aluminide ternary and quaternary and higher level alloys that contain elements that have been added to produce certain desirable mechanical improvements to the substrate.

Alternatively, the oxide coatings may be formed on other titanium and aluminum containing substrates. Included is the titanium-aluminum system consisting of the titanium-aluminum alloy disordered alpha phase ($\alpha$-TiAl) and beta phase ($\beta$-TiAl). Superalloys, and other alloys, metals, and materials that contain about 2% or more of aluminum and about 2% or more of titanium are also suitable as substrates upon which to form the protective oxides formed by the present invention.

Figure 14:
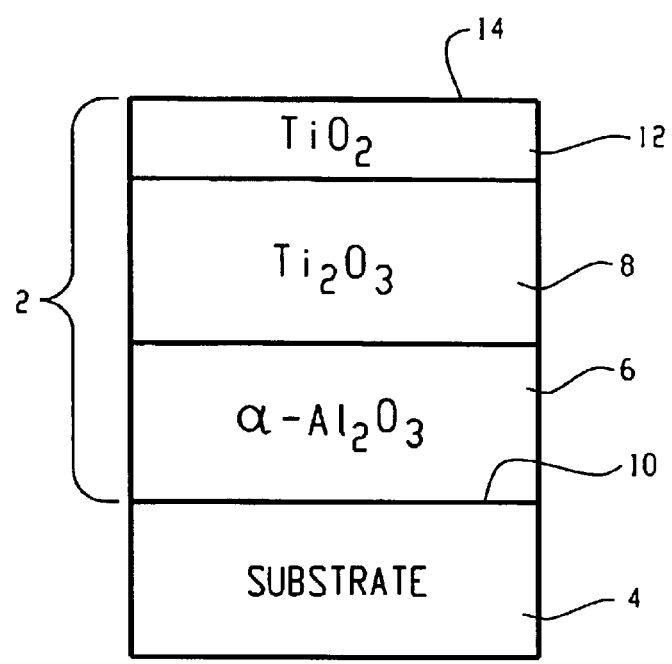
FIG. 14 is a drawing illustrating the multi-layer characteristics of the overall oxide coatings.

With reference to FIG. 14, a reactive barrier 2 is formed during the above-described first step of specific reactive element oxides. A titanium aluminide substrate 4 is modified by a first step such that the surface of the substrate forms a mixed specific reactive oxide film that resists corrosion, oxygen permeation, permeation by hydrogen isotopes, and serves other useful functions. This oxide protective coating 2 is formed because the intermediate titanium oxide, $Ti_2O_3$, not $TiO_2$, is formed with $\alpha$-$Al_2O_3$. In the low-water vapor partial pressure, high temperature oxygen region provided by the process, there exists a high solid solubility between both $\alpha$-$Al_2O_3$ and $Ti_2O_3$ phases. The two oxide phases have similar lattice constants and the same crystalline structure.

The equilibrium pressure for the formation of $\alpha$-$Al_2O_3$ is below the equilibrium pressure for the formation of $Ti_2O_3$, so that an $\alpha$-$Al_2O_3$ layer 6, the more stable oxide, forms directly on the substrate 4 in preference to a $Ti_2O_3$ enriched layer 8. In this atmosphere and at process temperature, both aluminum and titanium atoms diffuse from the bulk substrate to the substrate surface, react with the oxygen present there, and form their respective oxides. However, $\alpha$-$Al_2O_3$ is the most stable oxide and bonds strongly to the substrate 4. The titanium oxide on the substrate surface is reduced to titanium and oxygen by the more reactive aluminum metal present at the surface. As the $\alpha$-$Al_2O_3$ layer 6 grows thicker on the substrate 4 surface, the titanium atoms, reduced from the titanium oxide by the aluminum, diffuse outward toward the oxide/gas interface where they form the oxide, $Ti_2O_3$ layer 8. A separation of the two phases occurs with $\alpha$-$Al_2O_3$ concentrating at the oxide/substrate interface 10 and $Ti_2O_3$ concentrating at an oxide/gas interface 12. The $Ti_2O_3$ serves to provide a graded interface to reduce the stress caused by any tensile force applied to try to pull the oxide away from the substrate.

When the newly formed oxide coating grown by the present process is then put in air at high temperature and atmospheric pressure, the residual titanium metal causes some of the $Ti_2O_3$ to be oxidized to form $TiO_2$. The $TiO_2$, grows as a modified layer 12, the $TiO_2$ growing as $\mu$m-diameter fibers on the previous interface 12 as the crystal fibers are embedded in the $\alpha$-$Al_2O_3$ and $Ti_2O_3$ matrix and grow perpendicular to the plane of the titanium aluminide. The process will continue until nearly complete oxidation of the reactive barrier layer 2 is achieved with a barrier layer that may be several micrometers thick. At the completion of the air oxidation during the second step process, the surface 12 of the barrier layer 2 shown in FIG. 14 will consist mostly of $TiO_2$ showing the prominent fiber-like appearance of the $TiO_2$ crystals indicated by the SEM photographs of FIG. 5.

Figure 15:
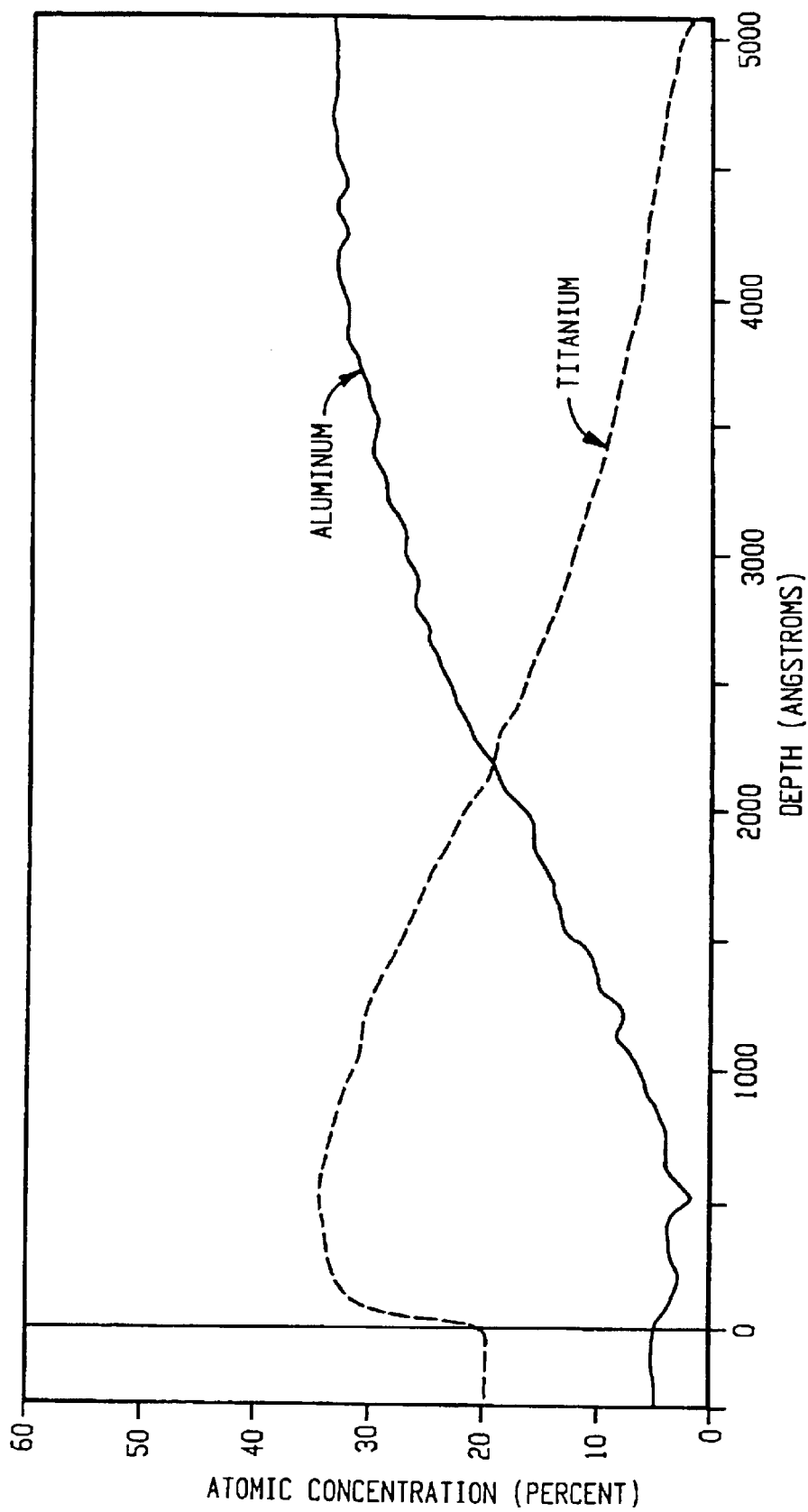
FIG. 15 is an ESCA depth profile demonstrating changes in the concentration of titanium as $Ti_2O_3$ and aluminum as $\alpha\text{-}Al_2O_3$ with depth from the gas/substrate interface.
Figure 16:
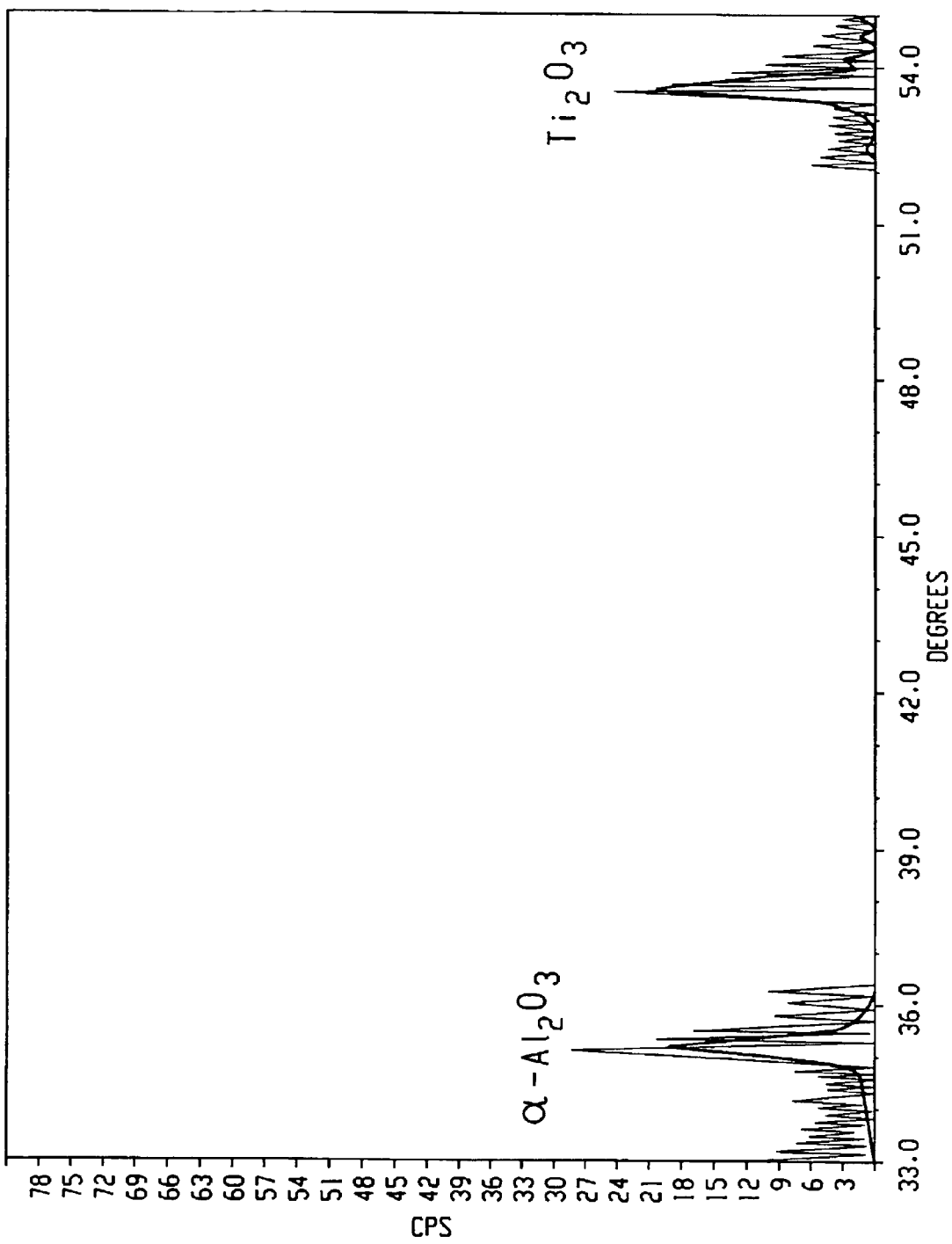
FIG. 16 is an x-ray defraction study showing the presence of $\alpha\text{-}Al_2O_3$ and $Ti_2O_3$.

The separation of $\alpha$-$Al_2O_3$ and $Ti_2O_3$ phases and formation of the $\alpha$-$Al_2O_3$/substrate interface during the above-described first step are extremely important discoveries, and can be seen in FIGS. 15 and 16. FIG. 15 is an ESCA depth profile of the immediate oxide coating. As can be seen, the concentration of Ti (as $Ti_2O_3$) is greatest at shallower depths, and the concentration of Al (as $\alpha$-$Al_2O_3$) is greatest closer to the substrate surface. FIG. 16 is an X-ray diffraction study showing the presence of $\alpha$-$Al_2O_3$ and $Ti_2O_3$ on the substrate surface after initial processing. This separation shows that the present processing method forms a strongly bonded $\alpha$-$Al_2O_3$ oxide directly to a titanium-aluminide substrate. The $\alpha$-$Al_2O_3$ prevents oxygen from reaching the substrate. At least about 2 wt % of aluminum must be present in the substrate during the initial process to form the $\alpha$-$Al_2O_3$/substrate oxygen barrier coating. If this limitation is met, the whole range of variation of aluminum with titanium can produce valid protective oxide coatings. The substrates containing the higher percentages of titanium may be preferred for their ability to function at higher temperatures.

The thickness of the first-step $\alpha$-$Al_2O_3$ oxide coating is important in determining the strength of the coating. X-ray diffraction studies and electron spectroscopy for chemical analysis (ESCA) data have shown that the strength of the oxide coating varies with the thickness of the oxide coating. If the coating is too thin, there is not enough protection against oxidation. If the coating is too thick, it becomes somewhat cumbersome and loses adhesion properties. The optimum thickness of the oxide coating, where both protection from oxidation and strong adhesion properties remain intact, is between about 500 and about 1500 nm. Stud pull tests show that the present coating can survive an applied tensile stress greater than about 15,000 psi. These tests were carried out via the use of a Sebastion V unit to try to pull the oxide from the substrate in a pull test in which a tensile pull rod is bonded to the oxide surface by epoxy.

A sulfur scavenger is used prior to the formation of the protective coating. Free sulfur in a bulk substrate diffuses to the surface and condenses in voids or cavities, reducing the bond strength of any oxide present. One of the benefits of the present technique is the very strong bonds formed between $\alpha$-$Al_2O_3$ and the titanium aluminide substrate. These bonds have a strength in excess of 15,000 psi. Therefore, free sulfur should be removed from the surface of the substrate to enhance bonding of the barrier layer to the substrate. In one process, a flowing hydrogen gas in a preliminary processing step, at atmospheric pressure, between about 550 and 1100° C., and containing about 1 to 750 ppm water, preferably containing about 1 to about 500 ppm water vapor, reacts with any sulfur that has condensed in voids or vacancies at the surface of a substrate. Another hydrogen producing atmosphere is an inert gas such as He or Ar, containing preferably less than about 750 ppm of water vapor which produces hydrogen that also reacts with any sulfur in a similar manner. Still another hydrogen producing atmosphere consists only of water vapor, over a partial pressure range of from about $1\times10^{-6}$ to about $1\times10^{-2}$ kPa, which produces hydrogen that also reacts with any sulfur in a similar manner. The interaction of water vapor produces oxygen and hydrogen. The oxygen reacts with aluminum to form $\alpha$-$Al_2O_3$, and the hydrogen is then available to react with sulfur to form hydrogen sulfide—a gas that is removed with the flowing gaseous atmosphere.

In another embodiment of the present invention, a repair method for damaged oxide coatings formed during the present processes is provided. Previously, first and second step processes have been described that provide the ability for the surface of the coating to be self-repaired if some of the surface material is removed by an impact of a particle, etc during processing. The repair process that will be considered now is if damage has occurred to the overall protective coating provided by the present processes after processing. For example, if the processed piece has been welded so that the regions of the entire protective coating created by the present processes are destroyed. Damage to the overall protective oxide coating in limited regions can be repaired. For example, removal of a small area of oxide may occur by the impact of a high-velocity particle in a manner that causes local destruction of small areas that removes coatings formed by both step-one and step-two processes. Or, two previously processed parts may be welded or brazed together, perhaps by laser welding. The resulting weld lacks a proper protective oxide unless laser heating is used to repeat the step-one α-$Al_2O_3$ layer formation process after the weld is completed followed by the second step process. Small region repairs are accomplished by heating the locally damaged surface area in the appropriate process environment. Such local surface heating is preferably accomplished by laser-heating procedures.

In a preferred embodiment, a scanning mechanism causes a pulsed laser with variable repetitive pulsing rate to sweep in both the X and Y directions over a selected area. The scanning rates of both the X and Y directions are adjusted to provide heating of the damaged or newly welded area, and also to provide a gradient in temperature between the damaged area and the much lower temperature of the bulk material surrounding the oxide protected area. Any laser that operates between ultraviolet and infrared radiation can be used provided certain beam intensities are not exceeded. It is very important that the laser intensity not exceed $10^8$ J/$cm^2$ for the ultraviolet wavelengths, and not exceed $10^{11}$ J/$cm^2$ for the infrared light. For laser wavelengths between the UV radiation and infrared radiation, the limiting intensity varies approximately linearly with wavelength. Above the limiting laser intensities given, ablation of material may occur. Only heating is desired, so laser intensities below these limits must be used.

Importantly, the area to be repaired is encompassed by the above-described process environment. Particularly, a gaseous environment at atmospheric pressure that contains approximately 1 to about 500 ppm of water vapor is preferred. An inert gas environment such as He or Ar, or at a hydrogen environment at atmospheric pressure that contains approximately 1 to about 500 ppm of water vapor is especially preferred. Still another alternate atmosphere consists only of water vapor, over a partial pressure range of from $1 \times 10^{-6}$ to $1 \times 10^{-2}$ kPa. Once the α-$Al_2O_3$ oxide protective barrier has been formed by the above-described first step, the second step is carried out in air at high temperature to form the overall, self-healing protective coating consisting of a layered structure from the substrate to the surface of α-$Al_2O_3$/$Ti_2O_3$/$TiO_2$.

The invention has been described with reference to the preferred embodiments. Obviously, modifications and alternations will occur to others upon reading and understanding the preceding detailed description. It is intended that the invention be construed as including all such modifications and alterations insofar as they come within the scope of the appended claims or the equivalents thereof.

What is claimed is:

1. A process for forming a specific reactive element barrier on an aluminum containing substrate, the process comprising:
   creating a dry air atmosphere, which includes nitrogen and oxygen gas, with a concentration of water vapor below about 750 ppm at a temperature above about 550° C. contiguous to a surface of the substrate on which the barrier layer is to be formed;
   maintaining the temperature above 550° C. and water vapor concentration below about 750 ppm;
   reacting the water vapor in the dry air atmosphere with specific reactive elements at the substrate surface to form a specific reactive element oxide barrier layer which is strongly bonded to the substrate surface, said barrier layer including an aluminum oxide layer at the substrate/barrier layer interface.

2. The process of claim 1 wherein said aluminum containing substrate further includes titanium, and said barrier layer further includes a titanium oxide layer at a barrier layer/atmosphere interface.

3. The process of claim 2 wherein the reacting step includes:
   dissociating oxygen in said water vapor; and
   reacting the dissociated oxygen with said specific reactive elements to form the aluminum and titanium oxide layers.

4. The process of claim 2 wherein said aluminum containing substrate includes at least 2% aluminum and at least 2% of titanium.

5. The process of claim 4 wherein said substrate includes $TiAl_3$.

6. The process of claim 1 further including:
   disassociating the water vapor into oxygen and hydrogen during the reacting step and reducing non-specific reactive elements on the surface of said substrate with the hydrogen/water vapor atmosphere.

7. The product formed by the process of claim 1.

8. The product of claim 7 wherein said aluminum containing substrate is selected from the group consisting of nickel aluminide, iron-aluminum alloy, and Fe-6Al.

9. A process for forming a specific reactive element barrier on an aluminum and titanium containing substrate, the process comprising:
   creating a dry air atmosphere with a concentration of water vapor below about 750 ppm at a temperature above about 550° C. contiguous to a surface of the substrate on which the barrier layer is to be formed;
   reacting the water vapor in the dry air atmosphere with specific reactive elements at the substrate surface to form a specific reactive element oxide barrier layer which is strongly bonded to the substrate surface, said barrier layer including an aluminum oxide layer including crystalline α-$Al_2O_3$ and a titanium oxide layer including crystalline $Ti_2O_3$, the crystalline α-$Al_2O_3$ and the $Ti_2O_3$ having like lattice constants.

10. The process of claim 9 wherein the dry air atmosphere includes 20–100 ppm of water vapor.

11. The product formed by the process of claim 9.

12. A process for forming a specific reactive element barrier on an aluminum and titanium containing substrate, the process comprising:
   exposing the substrate to atmospheric air with a concentration of water vapor below about 750 ppm at a temperature greater than about 500° C. contiguous to a surface of the substrate on which the barrier layer is to be formed;
   dissociating oxygen in said water vapor;
   reacting the dissociated oxygen with aluminum and titanium in the substrate to form aluminum and titanium oxide layers,
   the reacting step including forming crystalline fibers of $TiO_2$ titanium oxide.

13. The process of claim 12 wherein the reacting step is performed at a sub-atmospheric pressure.

14. The process of claim 13 wherein the pressure is between about $1 \times 10^{-6}$ to $1 \times 10^{-2}$ kPa.

15. The process of claim 13 wherein said temperature is between 550 and 1100° C.

16. The process of claim 12 wherein the water vapor has a pressure between about $1 \times 10^{-6}$ and $1 \times 10^{-2}$ kPa.

17. The process of claim 12 wherein the air is created free of hydrogen gas.

18. The process of claim 12 wherein the water vapor concentration is chemically reduced during the reacting step.

19. The product by the process of claim 12.

20. A process for forming a specific reactive element barrier on an aluminum containing substrate, the processing comprising:

creating a dry air atmosphere with a concentration of water vapor below about 100 ppm at a temperature above about 550° C. contiguous to a surface of the substrate on which the barrier layer is to be formed;

reacting oxygen dissociated from the water vapor in the dry air atmosphere with specific reactive elements at the substrate surface to form a specific reactive element oxide barrier layer which is strongly bonded to the substrate surface, said barrier layer including an aluminum oxide layer at a substrate/barrier layer interface and a second oxide layer at a barrier layer/atmosphere interface; and reacting sulfur at the substrate surface with hydrogen produced by dissociation of water vapor to form hydrogen sulfide gas; and removing the hydrogen sulfide gas from the substrate surface.

21. A product with a specific reactive element barrier on substrate, the product comprising:

a substrate containing aluminum and titanium;

an $\alpha$-$Al_2O_3$ aluminum oxide layer bonded to the aluminum containing substrate; and a $Ti_2O_3$ titanium oxide layer bonded to the $Al_2O_3$ layer.

22. The product of claim 21 wherein the oxide layers and the substrate adjacent the aluminum oxide layer are substantially free of sulfur.

23. The product of claim 21 wherein the $Ti_2O_3$ layer includes non-oxidized metals.

24. The product of claim 21 wherein a bond strength between layers is greater than 15,000 psi.

25. A process for forming a specific reactive element by layer on a titanium aluminide substrate, the process comprising:

creating a gaseous/water vapor atmosphere with a concentration of water vapor below about 750 ppm at a temperature above about 550° C. contiguous to a surface of the titanium aluminide substrate on which the barrier layer is to be formed;

while maintaining the temperature above about 550° C. and water vapor concentration below about 750 ppm, reacting the oxygen of the water vapor with specific reactive elements at the titanium aluminide substrate surface until:

$\alpha$-$Al_2O_3$ is formed directly on the substrate surface in preference to titanium oxide to form a crystalline $\alpha$-$Al_2O_3$ layer at a substrate/barrier layer interface;

titanium atoms from titanium oxide are reduced with aluminum and the titanium atoms diffuse outward through the $\alpha$-$Al_2O_3$ layer;

oxidizing the titanium atoms that have diffused through the $\alpha$-$Al_2O_3$ layer to form a crystalline $Ti_2O_3$ layer at a barrier layer/gas interface, the crystalline $\alpha$-$Al_2O_3$ and $Ti_2O_3$ have like lattice structures; and exposing the substrate and the $\alpha$-$Al_2O_3$ and $Ti_2O_3$ layers to atmospheric air with a water vapor content above 750 ppm at a temperature greater than about 500° C. to reach remaining titanium atoms to form $TiO_2$ fibers.

26. The process of claim 25 further including:

diffusing other metals in the substrate through the $\alpha$-$Al_2O_3$ layer into the $Ti_2O_3$ layer in non-oxidized state.

27. The process of claim 25 wherein the $TiO_2$ fibers are 1–5 micrometers in diameter.

28. A barrier layer protected titanium aluminide material substrate comprising:

a crystalline $\alpha$-$Al_2O_3$ layer bonded to a surface of the titanium aluminide substrate;

a crystalline $Ti_2O_3$ layer bonded to the $\alpha$-$Al_2O_3$ layer; and crystalline $TiO_2$ fibers in the $\alpha$-$Al_2O_3$ and $Ti_2O_3$ layers.

29. A process for forming a specific reactive element bilayer on surface alloys containing at least 2 wt % of aluminum and at least 2 wt % of titanium with trace amounts of sulfur, the process comprising:

placing the alloy surface in a sealed environment;

creating an atmosphere of dry atmospheric air and water vapor at an above atmospheric pressure adjacent the surface, the water vapor having a concentration such that a dew point of less than −25° C. is achieved;

heating the dry atmospheric air and water vapor to between 550° C. and 1050° C.;

reacting oxygen of the water vapor molecules with aluminum metal to form $\alpha$-$Al_2O_3$ on a surface of the alloy and reacting hydrogen from the water vapor molecules with sulfur to create hydrogen sulfide;

removing hydrogen sulfide from the defined environment;

reducing titanium atoms with aluminum metal and diffusing the reduced titanium atoms outward through the $\alpha$-$Al_2O_3$ layer and oxidizing the diffused titanium ions to form a $Ti_2O_3$ layer and an $\alpha$-$Al_2O_3$ and $Ti_2O_3$ matrix with $TiO_2$ fibers.

30. The process according to claim 29 wherein the heating is achieved by heating the substrate surface with a laser to heat the surface to at least 550° C.

31. A process for forming a specific reactive element bilayer on a substrate containing at least 2 wt % of titanium and at least 2 wt % of aluminum with trace amounts of sulfur, the process comprising:

(a) placing the alley substrate in a sealed region;

(b) reducing a pressure in the sealed region to achieve a sub-atmospheric partial air pressure between $1\times10^{-6}$ and $1\times10^{-2}$ kPa and a partial water pressure between $1\times10^{-6}$ and $1\times10^{-5}$ kPa at a temperature between 800° C. and 1050° C.;

(c) reacting oxygen from water vapor molecules with aluminum metal of the alloy to form $\alpha$-$Al_2O_3$ and reacting hydrogen from the water vapor molecules with trace sulfur to form hydrogen sulfide;

(d) continuing step (c) to form a crystalline $\alpha$-$Al_2O_3$ layer of at least 500 Å at a substrate/barrier layer interface and reducing titanium oxides with aluminum metal to form titanium atoms which diffuse outward through the $\alpha$-$Al_2O_3$ layer to form a crystalline $Ti_2O_3$ layer at a barrier layer/gas interface, which crystalline $\alpha$-$Al_2O_3$ and crystalline $Ti_2O_3$ layers have similar lattice structures;

(e) adjusting a water vapor content of the atmosphere to have a water partial pressure between $1\times10^{-3}$ and $1\times10^{-2}$ kPa at a temperature between 800° C. and 1050° C.; and (f) forming an $\alpha$-$Al_2O_3$ and $Ti_2O_3$ matrix with $TiO_2$ fibers embedded in the matrix.

32. A method for forming a specific reactive element bilayer on titanium aluminides, the process comprising:

creating a dry air and water vapor atmosphere with a dew point between −45° C. and −65° C.;

heating the atmosphere to at least 550° C.;

reacting oxygen from water vapor molecules in the atmosphere with aluminum in the titanium aluminide, dissociating the water molecules and forming $\alpha$-$Al_2O_3$ on a surface of the titanium aluminide and reacting hydrogen disassociated from the water vapor molecules with sulfur in the titanium aluminide to remove the sulfur from the titanium aluminide;

reducing titanium in the titanium aluminide by aluminum and diffusing the reduced titanium atoms through the $\alpha$-$Al_2O_3$ layer and oxidizing the titanium atoms which diffused through the $\alpha$-$Al_2O_3$ layer to form a $Ti_2O_3$ layer;

raising the temperature of the atmosphere to at least 800° C. and forming an $\alpha$-$Al_2O_3$ and $Ti_2O_3$ matrix and $TiO_2$ fibers in the matrix.

33. A process for forming a specific reactive element bilayer on a titanium aluminide substrate, the process comprising:

creating an atmosphere within a vacuum with a partial air pressure between $1\times10^{-6}$ and $1\times10^{-2}$ kPa with a partial water vapor pressure between $1\times10^{-6}$ and $1\times10^{-5}$ kPa at a temperature above 800° C. contiguous to a surface of the titanium aluminide substrate such that water vapor molecules react with aluminum in the substrate to form an $\alpha$-$Al_2O_3$ layer on the substrate which is grown to a thickness of at least 500 Å and forming a $Ti_2O_3$ layer on the $\alpha$-$Al_2O_3$ layer;

adjusting the partial water pressure of the atmosphere to between $1\times10^{-3}$ and $1\times10^{-2}$ kPa at a temperature of at least 800° C. forming the $\alpha$-$Al_2O_3$ and $Ti_2O_3$ layers into a crystalline $\alpha$-$Al_2O_3$ and $Ti_2O_3$ matrix and $TiO_2$ fibers embedded in the matrix.

34. The process as set forth in claim 33 wherein the element which does not form its oxides in the presence of aluminum includes at least one of nickel, iron, and chromium.

35. A process for forming an $\alpha$-$Al_2O_3$ protective oxygen barrier on a surface of a substrate containing aluminum and at least one additional element which does not form oxides in the presence of aluminum, the process comprising:

creating an atmosphere of atmospheric air with below 750 ppm water vapor at a temperature between 550° C. and 1050° C.;

reacting water vapor molecules with aluminum in the substrate to form a crystalline $\alpha$-$Al_2O_3$ layer of at least 500 Å on the substrate.

36. A process for forming an $\alpha$-$Al_2O_3$ oxide protective oxygen barrier on a surface of a substrate containing at least 2 wt % aluminum and at least one of nickel, iron, and chromium, the process comprising:

(a) creating an atmosphere of atmospheric air and water vapor at sub-atmospheric pressures on a surface of the substrate with a concentration of water vapor between $1\times10^{-5}$ and $1\times10^{-6}$ kPa at a temperature between 550° C. and 1050° C.; and (b) while continuing step (a), reacting oxygen from the water vapor with aluminum to form a crystalline $\alpha$-$Al_2O_3$ layer on the surface of the substrate and reacting hydrogen reduced from the water vapor with sulfur to remove sulfur from the substrate enabling a stronger bond between the $\alpha$-$Al_2O_3$ layer and the substrate.

* * * * *